(12) United States Patent
Takahashi et al.

(10) Patent No.: US 6,564,323 B2
(45) Date of Patent: May 13, 2003

(54) PERSONAL INFORMATION CONTROLLING METHOD AND PERSONAL INFORMATION CONTROLLING APPARATUS

(75) Inventors: Hideo Takahashi, Yokohama (JP); Jun Nitta, Matsuyama (JP); Mitsunobu Tasaka, Kawasaki (JP); Kei Takeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/166,124

(22) Filed: Jun. 11, 2002

(65) Prior Publication Data

US 2002/0162006 A1 Oct. 31, 2002

Related U.S. Application Data

(63) Continuation of application No. 09/192,150, filed on Nov. 16, 1998, now abandoned.

(30) Foreign Application Priority Data

Nov. 17, 1997 (JP) .............................. 9-315473

(51) Int. Cl.⁷ ................................ H04W 9/00
(52) U.S. Cl. ................ 713/182; 713/170; 713/186
(58) Field of Search ................ 713/170, 182, 713/186

(56) References Cited

U.S. PATENT DOCUMENTS

| | | | | |
|---|---|---|---|---|
| 4,295,039 A | | 10/1981 | Stuckert ................. 235/380 |
| 4,349,695 A | * | 9/1982 | Morgan et al. ........... 713/170 |
| 4,458,315 A | | 7/1984 | Uchenick ................ 364/200 |
| 4,459,306 A | | 7/1984 | Stein et al. ............. 235/383 |
| 4,558,176 A | | 12/1985 | Arnold et al. .......... 178/22.08 |
| 4,599,489 A | | 7/1986 | Cargile ................ 178/22.08 |
| 4,694,412 A | | 9/1987 | Domenik et al. ......... 364/717 |
| 4,876,717 A | | 10/1989 | Barron et al. ............ 380/25 |
| 4,935,962 A | * | 6/1990 | Austin .................. 713/159 |
| 4,956,769 A | | 9/1990 | Smith ................... 364/200 |
| 5,060,263 A | * | 10/1991 | Bosen ................... 713/184 |
| 5,065,429 A | * | 11/1991 | Lang ..................... 705/56 |
| 5,436,972 A | | 7/1995 | Fisher .................... 380/25 |
| 5,534,855 A | | 7/1996 | Shockley et al. ......... 340/825.3 |
| 5,614,927 A | | 3/1997 | Gifford et al. ............ 395/612 |
| 5,643,086 A | | 7/1997 | Alcorn et al. .............. 463/29 |
| 5,862,223 A | * | 1/1999 | Walker et al. ............ 380/705 |
| 6,085,320 A | * | 7/2000 | Kaliski Jr. ............... 713/168 |
| 6,088,450 A | * | 7/2000 | Davis et al. .............. 713/182 |
| 6,128,389 A | * | 10/2000 | Chan et al. ............... 380/247 |
| 6,263,438 B1 | * | 7/2001 | Walker et al. ............ 713/178 |

OTHER PUBLICATIONS

"A Really Good Book about Pretty Good Privacy" O'Reilly & Associates, Inc., ISBN 1–56592–098–8, pp. 216–227.

* cited by examiner

Primary Examiner—Thomas R. Peeso
Assistant Examiner—Kambiz Zand
(74) Attorney, Agent, or Firm—Antonelli, Terry, Stout & Kraus, LLP

(57) ABSTRACT

A personal information controlling method and apparatus for controlling pieces of personal information and for outputting a specific piece of personal information on a personal information registrant to a personal information referencer in response to a request by the personal information registrant. The invention provides that an inquiry code is issued by generating and outputting an inquiry code in accordance with an instruction from the personal information registrant. The inquiry code is to be used by the personal information referencer to acquire the specific piece of personal information as an identification of the specific piece of personal information. The invention also provides that personal information is acquired by requesting the personal information referencer to enter the inquiry code and outputting the specific piece of personal information identified by the inquiry code if the inquiry code entered by the personal information referencer matches the issued inquiry code.

15 Claims, 28 Drawing Sheets

| REGISTRANT ID 1511 | ADDRESS 1512 | HOUSEHOLDER NAME 1513 | --- | 1510 |
|---|---|---|---|---|
| A1001 | 50-2 SAKURADAI | ICHIRO TANAKA | | |
| | | | | |
| ⋮ | ⋮ | ⋮ | ⋮ | |

| REGISTRANT ID 1521 | INQUIRY CODE 1522 | 1520 |
|---|---|---|
| A1001 | 589234 | |
| | | |
| ⋮ | ⋮ | |

| REGISTRANT ID 1531 | REGISTRANT PASSWORD 1532 | 1530 |
|---|---|---|
| A1001 | X9P21A | |
| | | |
| ⋮ | ⋮ | |

FIG. 11

```
THE FOLLOWING INQUIRY CODE HAS
       BEEN ISSUED:
             589234
   PLEASE, NOTIFY THE PERSONAL
  INFORMATION REFERENCER OF THE
      ABOVE INQUIRY CODE !
```
640

FIG. 12

```
   THE RESIDENT CARD DATA YOU
 REQUESTED IS GIVEN AS FOLLOWS:

HOUSEHOLDER NAME: ICHIRO TANAKA
ADDRESS: 50-2 SAKURADAI...
```
650

FIG. 20

| REFERENCER ID | REFERENCER PASSWORD |
|---|---|
| B2001 | 551PCB |
|  |  |
| ⋮ | ⋮ |

| REGISTRANT ID | INQUIRY CODE | REFERENCER ID |
|---|---|---|
| A1001 | 589234 | B2001 |
|  |  |  |
| ⋮ | ⋮ | ⋮ |

START

STORE A REGISTRANT ID 6301 AND AN INQUIRY CODE 6302 ENTERED BY THE PERSONAL INFORMATION REFERENCER 72 IN A WORK AREA 1450
— 50401

STORE A REFERENCER ID 6303 AND A REFERENCER PASSWORD 6304 ENTERED BY THE PERSONAL INFORMATION REFERENCER 72 IN THE WORK AREA 1450
— 50801

CALL A PERSONAL INFORMATION REFERENCER AUTHENTICATING ROUTINE 14330 FOR VERIFYING THE VALIDITY OF THE PERSONAL INFORMATION REFERENCER 72 BY COMPARISON OF THE REFERENCER ID 6303 AND THE REFERENCER PASSWORD 6304 WITH RECORDS CATALOGED IN THE REFERENCER CONTROL TABLE 1540
— 50802

50803

CHECK THE RETURN VALUE RECEIVED FROM THE PERSONAL INFORMATION REFERENCER AUTHENTICATING ROUTINE 14330?

FALSE (THE PAIR COMPRISING THE REGISTRANT ID 6301 AND THE INQUIRY CODE 6302 IS INVALID

OUTPUT ERROR NOTIFICATION DATA TO THE COMMUNICATION CONTROLLING PROGRAM 1410 BEFORE ENDING THE PROCESSING
— 50804

CALL AN INQUIRY CODE AUTHENTICATING ROUTINE 14310 FOR CHECKING THE VALIDITY OF THE PAIR COMPRISING THE REGISTRANT ID 6301 AND THE INQUIRY CODE 6302
— 50402

50403

CHECK THE LOGIC VALUE RETURNED BY THE INQUIRY CODE AUTHENTICATING ROUTINE 14310?

FALSE (THE REFERENCER PASSWORD IS INVALID

OUTPUT ERROR NOTIFICATION DATA TO THE COMMUNICATION CONTROLLING PROGRAM 1410 BEFORE ENDING THE PROCESSING
— 50404

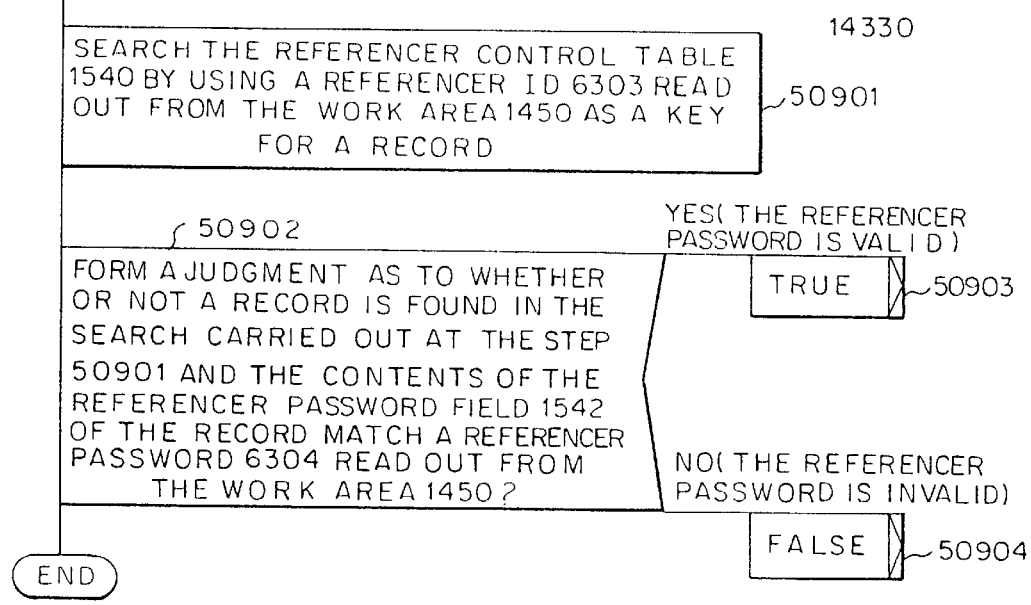
FIG. 25
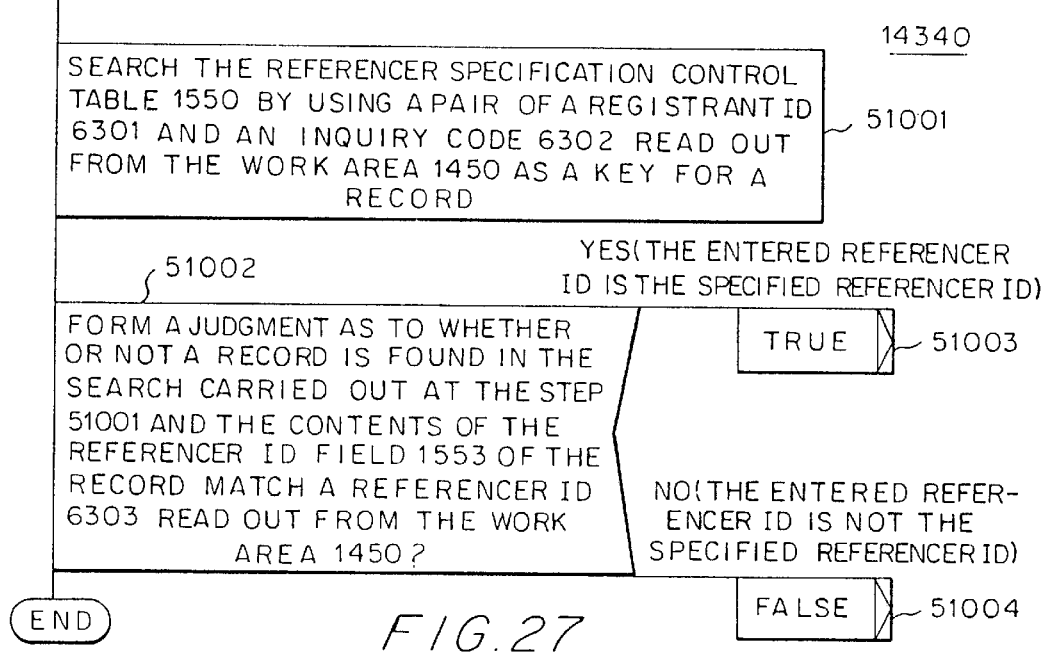
FIG. 26
FIG. 27
| 1561 | 1562 | 1563 | 1560 |
|---|---|---|---|
| REGISTRANT ID | INQUIRY CODE | VALIDITY TERM EXPIRATION DATE | |
| A1001 | 589234 | 980331 | |
| | | | |
| : | : | : | |

START

50101 — STORE THE ENTERED REGISTRANT ID 6201 AND THE ENTERED REGISTRANT PASSWORD 6202 IN A WORK AREA 1440

50102 — CALL A PERSONAL INFORMATION REGISTRANT AUTHENTICATING ROUTINE 14210 FOR CHECKING THE VALIDITY OF THE PAIR COMPRISING THE REGISTRANT ID 6201 AND THE REGISTRANT PASSWORD 6202

50103 — CHECK THE LOGIC VALUE RETURNED BY THE PERSONAL INFORMATION REGISTRANT AUTHENTICATING ROUTINE 14210?

TRUE (THE REGISTRANT PASSWORD IS VALID)

50104 — CALL AN INQUIRY CODE GENERATING ROUTINE 14220 FOR GENERATING AN INQUIRY CODE CORRESPONDING TO THE REGISTRANT ID 6201

51101 — CALL A VALIDITY TERM CATALOGING ROUTINE 14240 FOR CATALOGING THE TERM OF VALIDITY OF AN ISSUED INQUIRY CODE

50105 — GENERATE INQUIRY CODE NOTIFICATION DATA TO BE DISPLAYED ON THE INQUIRY CODE NOTIFYING SCREEN 640 FROM THE INQUIRY CODE RETURNED BY THE INQUIRY CODE GENERATING ROUTINE 14220 AND PASS THE INQUIRY CODE NOTIFICATION DATA TO THE COMMUNICATION CONTROLLING PROGRAM 1410

FALSE (THE REGISTRANT PASSWORD IS INVALID)

50106 — OUTPUT ERROR NOTIFICATION DATA TO THE COMMUNICATION CONTROLLING PROGRAM 1410 BEFORE ENDING THE PROCESSING

END

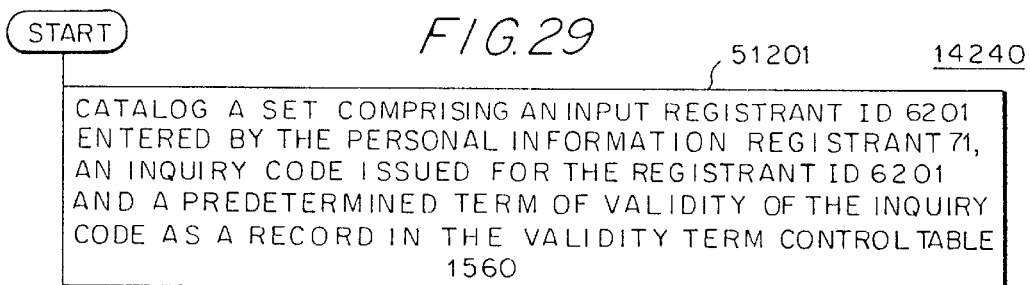
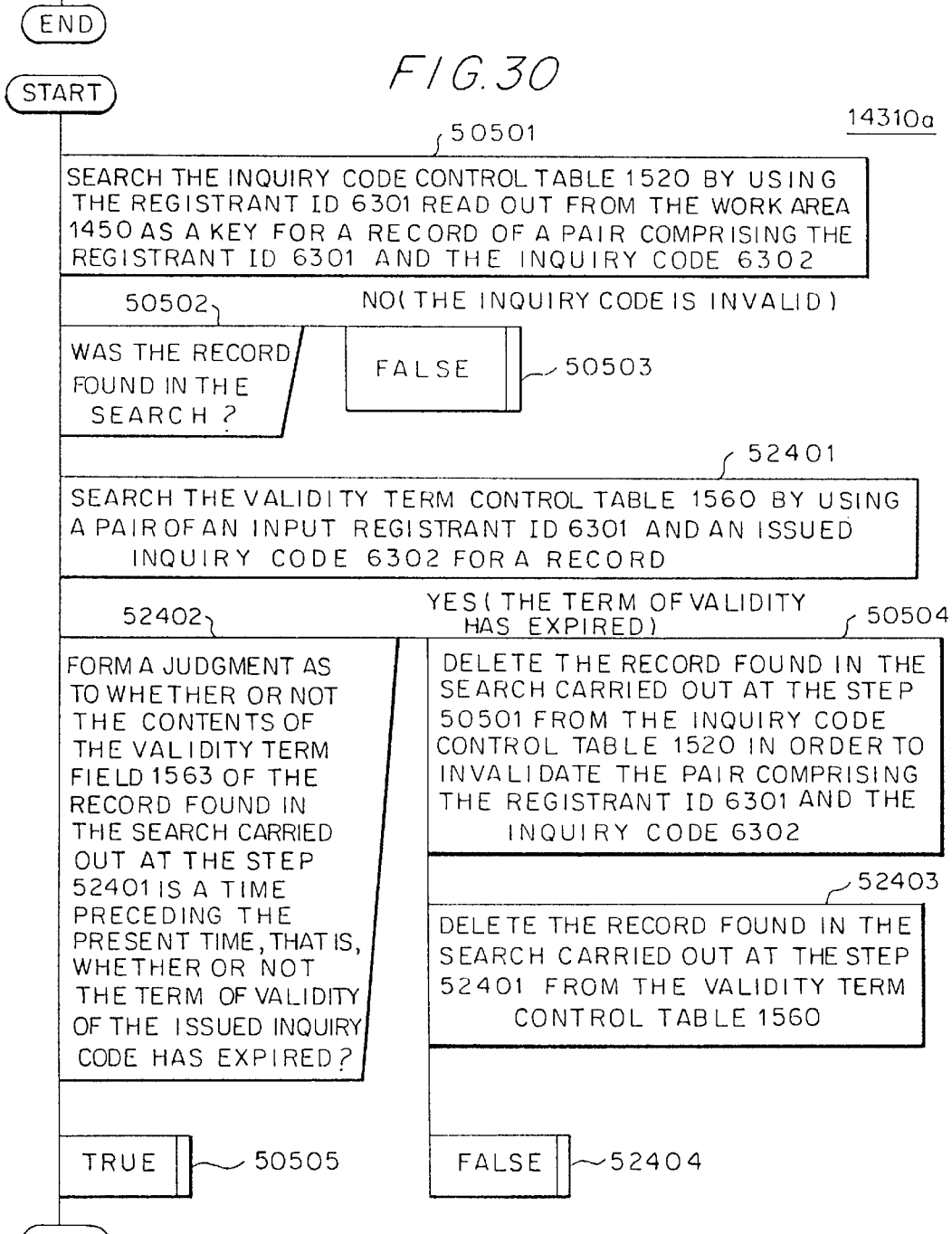

FIG. 35

START → 1420c

51501: STORE AN ENTERED REGISTRANT ID 6201, AN ENTERED REGISTRANT PASSWORD 6202 AND AN ENTERED REFERENCER ID 6203 IN A WORK AREA 1440

51502: CALL THE PERSONAL INFORMATION REGISTRANT AUTHENTICATING ROUTINE 14210 FOR CHECKING THE VALIDITY OF THE PAIR COMPRISING THE REGISTRANT ID 6201 AND THE REGISTRANT PASSWORD 6202

51503: CHECK THE LOGIC VALUE RETURNED BY THE PERSONAL INFORMATION REGISTRANT AUTHENTICATING ROUTINE 14210?

TRUE (THE REGISTRANT PASSWORD IS VALID)

51504: CONCATENATE THE REGISTRANT ID 6201 WITH THE REFERENCER ID 6203 AND STORE THE RESULT OF THE CONCATENATION IN THE CLEAR TEXT AREA 1491

51505: CALL A FUNCTION TYPED INQUIRY CODE GENERATING ROUTINE 1480 GENERATING AN INQUIRY CODE CORRESPONDING TO THE REGISTRANT ID 6201 AND THE REFERENCER ID 6203

51506: GENERATE INQUIRY CODE NOTIFICATION DATA TO BE DISPLAYED ON THE INQUIRY CODE NOTIFYING SCREEN 640 FROM THE INQUIRY CODE RETURNED BY THE FUNCTION TYPE INQUIRY CODE GENERATING ROUTINE 1480 AND PASS THE INQUIRY CODE NOTIFICATION DATA TO THE COMMUNICATION CONTROLLING PROGRAM 1410

FALSE (THE REGISTRANT PASSWORD IS INVALID)

51507: OUTPUT ERROR NOTIFICATION DATA TO THE COMMUNICATION CONTROLLING PROGRAM 1410 BEFORE ENDING THE PROCESSING

END

FIG. 36A

START

1430b

51601
STORE AN ENTERED REGISTRANT ID 6301 AND AN ENTERED INQUIRY CODE 6302, AN ENTERED REFERENCER ID 6303 AND AN ENTERED REFERENCER PASSWORD 6304 IN THE WORK AREA 1450

51602
CALL THE PERSONAL INFORMATION REFERENCER AUTHENTICATING ROUTINE 14330 FOR VERIFYING THE VALIDITY OF THE PERSONAL INFORMATION REFERENCER 72 BY COMPARISON OF THE REFERENCER ID 6303 AND THE REFERENCER PASSWORD 6304 WITH RECORD CATALOGED IN THE REFERENCER CONTROL TABLE 1540

51603 CHECK THE RETURN VALUE RECEIVED FROM THE PERSONAL INFORMATION REFERENCER AUTHENTICATING ROUTINE 14330?

FALSE (THE REFERENCER PASSWORD IS INVALID)
51604 OUTPUT ERROR NOTIFICATION DATA TO BE DISPLAYED ON AN ERROR NOTIFYING SCREEN TO THE COMMUNICATION CONTROLLING PROGRAM 1410 BEFORE ENDING THE PROCESSING

51605
CONCATENATE THE REGISTRANT ID 6301 WITH THE REFERENCER ID 6303 AND STORE A RESULT OF THE CONCATENATION IN THE CLEAR TEXT AREA 1491

51606
CALL A FUNCTION TYPED INQUIRY CODE AUTHENTICATING ROUTINE 14350 FOR CHECKING THE VALIDITY OF THE PAIR COMPRISING THE REGISTRANT ID 6301 AND THE INQUIRY CODE 6302

51607 CHECK THE LOGIC VALUE RETURNED BY THE FUNCTION TYPED INQUIRY CODE AUTHENTICATING ROUTINE 14350?

FALSE (THE INQUIRY CODE IS INVALID)
51608 OUTPUT ERROR NOTIFICATION DATA TO THE COMMUNICATION CONTROLLING PROGRAM 1410 BEFORE ENDING THE PROCESSING

SEARCH THE PERSONAL INFORMATION CONTROL TABLE 1510 BY USING THE REGISTRANT ID 6301 AS A KEY FOR A RECORD INCLUDING PERSONAL INFORMATION ASSOCIATED WITH THE REGISTRANT ID 6301 AND STORE THE PERSONAL INFORMATION INTO THE WORK AREA 1450

51610

GENERATE PERSONAL INFORMATION NOTIFICATION DATA TO BE DISPLAYED ON THE PERSONAL INFORMATION NOTIFYING SCREEN 650 FROM THE PERSONAL INFORMATION READ OUT FROM THE WORK AREA 1450 AND PASS THE PERSONAL INFORMATION NOTIFICATION DATA TO THE COMMUNICATION CONTROLLING PROGRAM 1410

END

START
→ ADD SECRET FUNCTION DATA 1571 TO THE CLEAR TEXT AREA 1491 — 51701
→ GENERATE AN INQUIRY CODE BY COMPUTATION OF MESSAGE DIGEST DATA OF A REGISTRANT ID AND A REFERENCER ID STORED IN THE CLEAR TEXT AREA 1491 BY USING THE SECRET KEY DATA — 51702
→ RETURN THE INQUIRY CODE TO THE CALLING PROGRAM — 51703
END

START
→ COMPUTE AN INQUIRY CODE FROM ENTERED DATA BY CALLING THE FUNCTION TYPED INQUIRY CODE GENERATING ROUTINE 1480 — 51801
→ 51802 COMPARE THE INQUIRY CODE RETURNED BY THE FUNCTION TYPED INQUIRY CODE GENERATING ROUTINE 1480 WITH AN INQUIRY CODE 6302 ENTERED BY THE PERSONAL INFORMATION REFERENCER 722?
  - YES (THE INQUIRY CODE IS VALID) → TRUE — 51803
  - NO (THE INQUIRY CODE IS INVALID) → FALSE — 51804
END

| SECRET INFORMATION ID (1581) | SECRET KEY DATA (1582) |
|---|---|
| 001 | 985762 |
| ⋮ | ⋮ |

START
↓
52101: PICK UP THE THREE LEAST SIGNIFICANT DIGITS OF A REGISTRANT ID 6201 STORED IN THE CLEAR TEXT AREA 1491 OF THE WORK AREA 1440 AS A SECRET KEY ID

52102: SEARCH THE SECRET KEY CONTROL TABLE 1580 FOR A PIECE OF SECRET KEY DATA BY USING THE SECRET KEY ID AS A KEY

52103: ADD A PIECE OF SECRET KEY DATA STORED IN THE SECRET KEY DATA FIELD 1582 OF A RECORD FOUND IN THE SEARCH TO THE CLEAR TEXT AREA 1491

52104: COMPUTE AN INQUIRY CODE AS MESSAGE DIGEST DATA OF THE CLEAR TEXT AREA 1491

52105: RETURN THE INQUIRY CODE TO THE CALLING PROGRAM

END

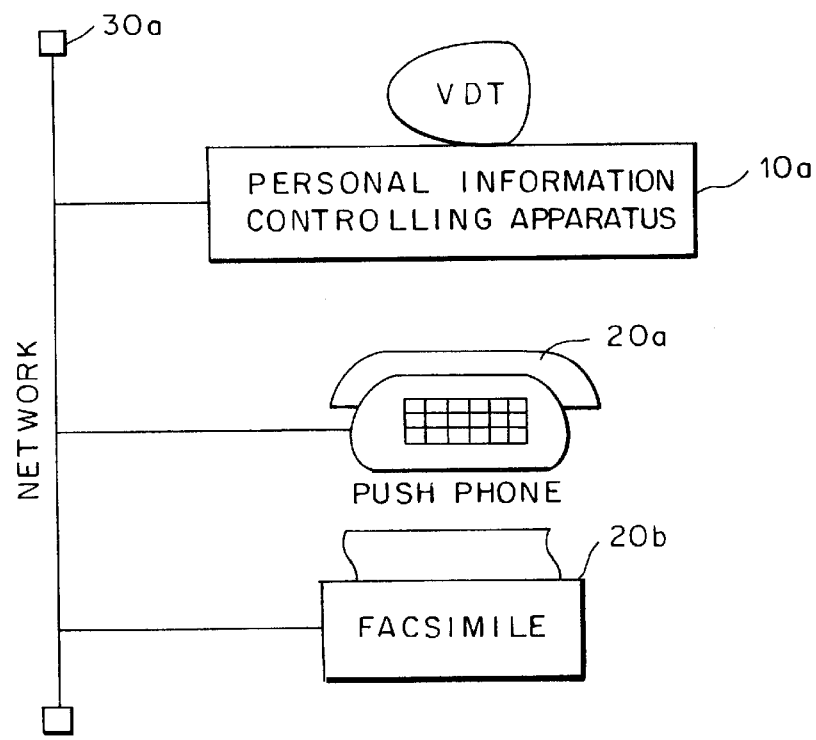

FIG. 41

PERSONAL INFORMATION CONTROLLING METHOD AND PERSONAL INFORMATION CONTROLLING APPARATUS

The present application is a continuation of application Ser. No. 09/192,150, filed Nov. 16, 1998 now abn., the contents of which are incorporated herein by reference.

BACKGROUND OF THE INVENTION

The present invention relates to an apparatus for electronically storing and controlling personal information. More particularly, the present invention relates to a processing method and apparatus used by a second party rendering services of providing personal information on a first party, who registered the information to the second party, only to a specified third party permitted by the first party to refer to the information online. Even more particularly, the present invention relates to a processing method and apparatus used by a second party rendering services of providing various kinds of personal information such as a resident card a certificate of a seal impression, birth certificates and the like, which have been registered to the second party by a first party to be used as a legal proof of the first party, only to a specified third party permitted by the first party to refer to the information online.

A local self-governing body such as a municipal office, that is, a second party, electronically keeps information on individuals and corporations such as information on composition of household members birth and death records, stamp data of a registered seal, articles of incorporation, etc. Such a second party renders services such as granting a copy of such information when requested by a first party, that is, a person who registered the information to the local self-governing body. It should be noted that, in the present specification, such information is generically referred to hereafter as personal information, whereas a person who registers personal information of the person to a second party is referred to hereafter as a personal information registrant.

At the present time, a request for a certificate based on the personal information is automated by using a magnetic card having magnetic stripes. The use of the magnetic card is intended to increase the efficiency of the processing to grant the certificate. In this automated method, the personal information registrant, who serves as an operator of an automatic certificate granting apparatus for granting such a certificate, inserts a magnetic card bearing the identification information assigned to the registrant, then enters a password to obtain a copy of a desired certificate. Receiving a password, the automatic certificate granting apparatus makes an inquiry to a data base for storing personal information on a host computer about the validity of the password. After verifying that the password is valid, the automatic certificate granting apparatus prints the desired personal information as a certificate. In addition, in order to avoid falsification of the certificate, the term of validity as a certificate and a seal impression of the local self-governing body granting the certificate are automatically put on the printed copy. Normally, the personal information registrant submits the certificate obtained by following the procedure explained above to an executive agency such as a motor vehicle administration or the Public Safety Agency or to an enterprise, a third party, as an attachment to some notice or contract. The belief of the executive agency or the enterprise in the contents of the certificate is based on the seal impression of the local self-governing body granting the certificate which is put on the printed copy of the certificate. The method described above is disclosed in Japanese Patent Laid-open No. Hei 8-129587.

However, the above described method for granting a certificate adopted by use of an automatic certificate granting apparatus has the following two disadvantages:

(1) The method is inconvenient since it is necessary for a person who wants to obtain a granted certificate to visit the office of a local self-governing body.

(2) The method is further inconvenient since items described in an already granted certificate may change after the issuance of the certificate. Thus, the certificate must always be provided with a term of validity of about several months. Therefore, when the term of validity expires before the certificate obtained from the office is used, it is necessary for the applicant to get the certificate granted again with a renewed term of validity even if the items thereof remain the same.

The above described disadvantages can be said to be attributed to the fact that a granted certificate is printed on a piece of paper. The above disadvantages can possibly be overcome if personal information described in a certificate can be obtained online from a host computer which is used for keeping the personal information at the time the certificate is needed. Then, the personal information output by the host computer can be used in place of the certificate.

If the host computer goes online and easy online access to the computer can be made by a user, other disadvantages described below will be raised. Thus, there are some difficulties in achieving a method which allows a party to acquire personal information described in a certificate from the host computer online and use the information output by the computer in place of a certificate.

If the personal information registrant is allowed to make online access to the host computer, it is no longer possible to provide a valid certificate of the personal information acquired from the computer. Particularly, if the personal information registrant is allowed to acquire personal information online from the host computer, the registrant will be capable of falsifying the acquired information before printing it on equipment such as a printer. As a result, a third party cannot trust the validity of the printed personal information as a certificate.

To overcome the above described disadvantages, the right of online access to the host computer may, instead, be granted to the third party such as an executive agency or an enterprise to which a certificate is to be submitted. This is done in order to eliminate the possibility of the personal information registrant falsifying data of the certificate. If the personal information referencer acquires the personal information described in the certificate directly from the host computer, there will no longer be a reason for the information referencer to worry about the chance of such falsification. In this case, however, there is a disadvantage that the privacy of the personal information registrant can not be adequately protected, since the personal information referencer is capable of freely referring to any personal information stored in the host computer without the consent of the registrant of the personal information.

Accordingly, simply making the host computer which stores personal information available for access online does not satisfy the need for efficient and trustable processing of personal information due to the disadvantages described above. Namely, online access to the personal information stored by a host computer does not allow for the same trustability as contemporary certificates with respect to personal information obtained from the host computer.

Further, the privacy of the personal information registrant cannot be fully protected. As a result, the objective to acquire personal information used to from the host computer online and use the personal information in place of a certificate cannot be fully achieved.

Another method has been proposed to overcome the disadvantage of the conventional personal information controlling method and apparatus. This method involves a technique of simply applying a digital signature technology which can be used as a measure for avoiding falsification of personal information. Digital signature technology for example, is disclosed in "PGP: Pretty Good Privacy," by Simson Garfinkel and published by O'Reilley & Associates Inc., on pages 218 to 227. However, this technique is inconvenient for both the personal information registrant and the personal information referencer due to the fact that a recording medium which has stored thereon acquired personal information cannot be conveniently attached to a printed contract.

Assume that the office of a local self-governing body such as the municipal office grants a recording medium, which has for recorded thereon personal information with a digital signature appended thereto, to a personal information registrant in place of a printed certificate. In this case, the personal information registrant submits the recording medium to a personal information referencer in place of a printed certificate. According to current custom, however, the personal information registrant generally submits a certificate to the personal information referencer as an attachment to a printed contract. Submitting a printed contract with the attached certificate as set is very convenient for the personal information registrant. Submitting a recording medium with a printed contract as suggested by the proposed technique is very inconvenient for the personal information registrant when compared to the present way of submitting documents since it is difficult to attach the recording medium to the printed contract.

One may attempt to eliminate the recording medium from a set of submitted documents by printing the personal information normally recorded on a recording medium with a digital signature appended thereto, in a form similar to a printed copy of an electronic mail message with a digital signature appended thereto as shown in page 224 of the above Garfinkel reference. In order to verify the validity of printed personal information, however, it is necessary for the personal information referencer to convert the printed personal information back into electronic data. In addition, it is also necessary for the personal information referencer to have an apparatus with a function for authenticating a digital signature on the electronic data resulting from the conversion. Thus, the personal information reference is required to expend a large amount of labor to check the validity of printed personal information.

If the contracts themselves can be made electronically, then all of the work to submit a contract can also be done online along with the exchange of a certificate including a digital signature appended thereto for verifying the certificate. However, at present printed contracts are more comfortable to individuals and organizations. Thus, printed contracts rather than electronic contracts will continue to be extensively used.

SUMMARY OF THE INVENTION

It is an object of the present invention to provide a personal information controlling method and apparatus for controlling pieces of personal information such as data of resident cards, birth and death records, articles of incorporation, certificates of seal impressions and the like and for issuing a specific piece of personal information data at a request made by the owner of the personal information wherein:

(1) only a specific personal information referencer specified by a registrant of personal information is allowed to acquire the specific piece of personal information online; and (2) it is no longer necessary for the personal information registrant to exchange electronic data with the specific personal information referencer specified by the personal information registrant.

The present invention provides a personal information controlling method in personal information controlling apparatus for controlling pieces of personal information such as information on a composition of household members, birth and death records, articles of incorporation, stamp data of a registered seal impression and the like and for issuing a specific piece of personal information data at a request made by the owner of the personal information. The personal information controlling method includes an inquiry code issuing step of generating and outputting an inquiry code in accordance with an instruction given by the personal information registrant, wherein the inquiry code will be used by the personal information referencer making an attempt to acquire the specific piece of personal information as an identification of the specific piece of personal information, and a personal information acquiring step of requesting the personal information referencer to enter the inquiry code and outputting the specific piece of personal information identified by the inquiry code only if the inquiry code actually entered by the personal information referencer matches the true inquiry code generated and output at the inquiry code issuing step.

The inquiry code issuing step includes a registrant authenticating step of verifying validity of the personal information registrant instructing issuance of the inquiry code, and an inquiry code generating step of generating the inquiry code. The personal information acquiring step includes an inquiry code authenticating step of verifying validity of an inquiry code actually entered by the personal information referencer, and a personal information outputting step of outputting the specific piece of personal information identified by the inquiry code entered by the personal information referencer.

According to the present invention, since an inquiry code is generated at the inquiry code issuing step only if the personal information registrant itself operates the personal information controlling apparatus, an operator other than the personal information registrant itself is not capable of causing the personal information controlling apparatus to execute the processing necessary to carry out the issue of an inquiry code. An inquiry code can be issued only at a request made by the personal information registrant.

At the personal information acquiring step, on the other hand, a personal information referencer making an attempt to acquire personal information on a specific personal information registrant is required to enter an inquiry code which can be issued only at the inquiry code issuing step by the specific personal information registrant. The personal information referencer is capable of acquiring personal information only if the personal information registrant requests the personal information controlling apparatus to execute the inquiry code issuing step and informs the personal information referencer of an inquiry code issued at the step for the personal information owned by the personal information registrant. As a result, it is possible to achieve the first object of the present invention to allow only a specific personal information referencer appointed by a personal information registrant to acquire personal information owned by the personal information registrant in an online way.

In addition, data having such a length that the data can be manually marked on a document with a high degree of freedom may be used as an inquiry code. Examples of such data are the reference number of processing or a password generated from a random number. In order to notify a personal information referencer of an inquiry code, it is thus not necessary for a personal information registrant to pass electronic data to the personal information referencer. As a result, it is possible to achieve the second object of the present invention to eliminate the necessity to exchange electronic data between the personal information registrant and the specific personal information referencer.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 11 is a diagram illustrating the configuration of an inquiry code notifying screen 640;

FIG. 12 is a diagram illustrating the configuration of a personal information notifying screen 650;

FIG. 18 is a diagram illustrating the configuration of an inquiry code issuance application screen 620a;

FIG. 19 is a diagram illustrating the configuration of a personal information display application screen 630a;

FIG. 20 is a diagram illustrating the configuration of a referencer control table 1540 stored in the secondary storage unit 150;

FIG. 21 is a diagram illustrating the configuration of a referencer specification control table 1550 stored in the secondary storage unit 150;

FIG. 25 is a PAD diagram illustrating pieces of processing carried out by execution of a personal information referencer authenticating routine 14330 stored in the main memory unit 140;

FIG. 26 is a PAD diagram illustrating pieces of processing carried out by execution of a reference-registrant pair inspecting routine 14340 stored in the main memory unit 140;

FIG. 27 is a diagram illustrating the configuration of a validity term control table 1560 stored in the secondary storage unit 150;

FIG. 28 is a PAD diagram illustrating pieces of processing carried out by execution of an inquiry code issuing program 1420b stored in the main memory unit 140;

FIG. 29 is a PAD diagram illustrating pieces of processing carried out by execution of a validity term cataloging routine 14240 stored in the main memory unit 140;

FIG. 30 is a PAD diagram illustrating pieces of processing carried out by execution of an inquiry code authenticating routine 14310a stored in the main memory unit 140;

FIG. 35 is a PAD diagram illustrating pieces of processing carried out by execution of an inquiry code issuing program 1420c stored in the main memory unit 140;

FIG. 36 is a PAD diagram illustrating pieces of processing carried out by execution of a personal information output program 1430b stored in the main memory unit 140;

FIG. 37 is a PAD diagram illustrating pieces of processing carried out by execution of a function typed inquiry code generating routine 1480 stored in the main memory unit 140;

FIG. 38 is a PAD diagram illustrating pieces of processing carried out by execution of a function typed inquiry code authenticating routine 14350 stored in the main memory unit 140;

FIG. 39 is a diagram illustrating the configuration of a secret key control table 1580 stored in the secondary storage unit 150;

FIG. 40 is a PAD diagram illustrating pieces of processing carried out by execution of a function typed inquiry code generating routine 1480a stored in the main memory unit 140;

FIG. 41 is a diagram illustrating the configuration of a personal information controlling system implemented by the a sixth embodiment;

DETAILED DESCRIPTION OF THE PRESENT INVENTION

First Embodiment

Figure 43:
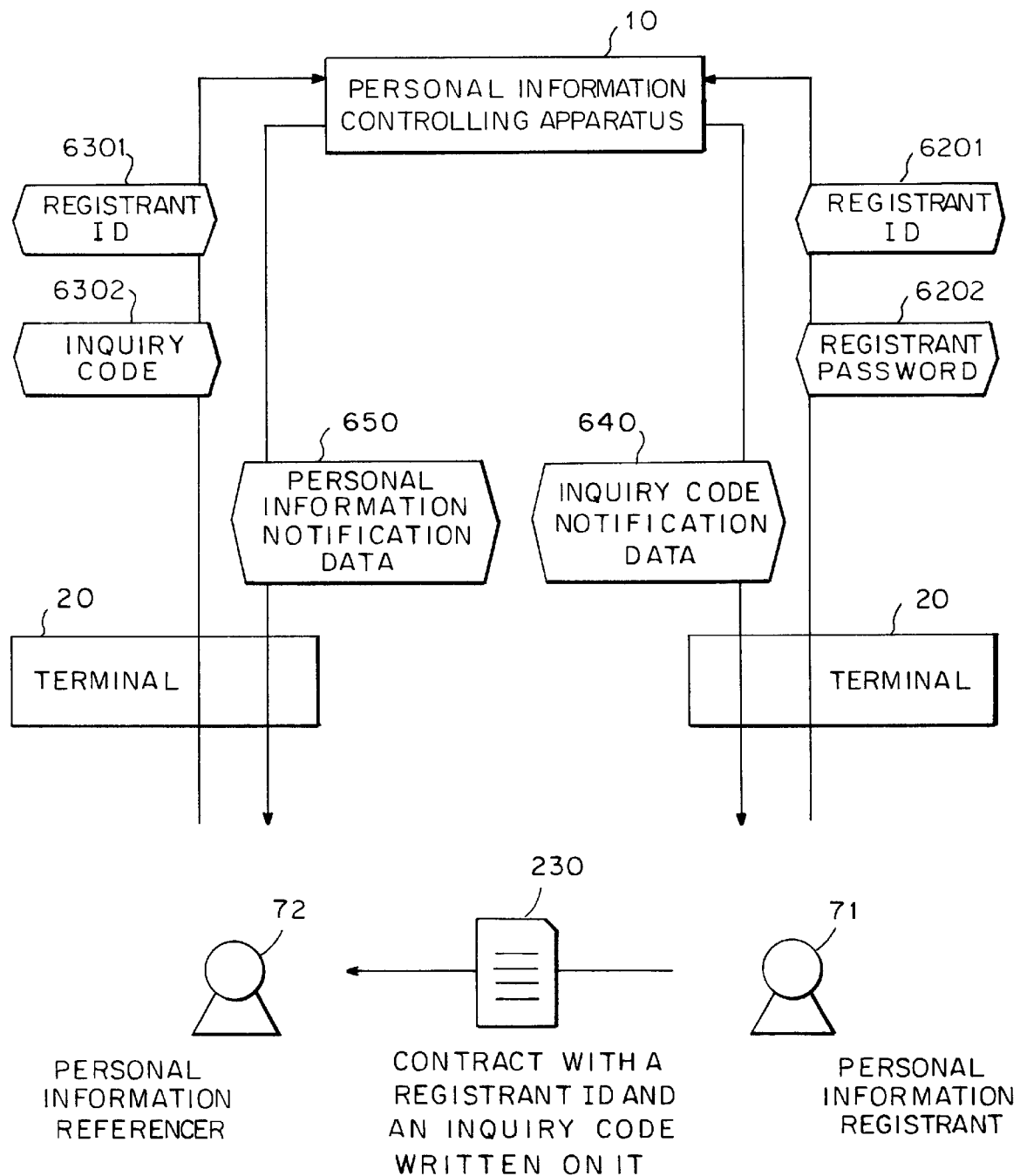
FIG. 43 is a diagram used for explaining the configuration and operation of the present invention in a simple and plain manner.

FIG. 43 is a diagram used for explaining the configuration and operation of the present invention in a simple and plain manner.

As illustrated in the FIG. 43, in the present embodiment, a personal information registrant 71 and a personal information referencer 72 use personal information controlling apparatus 10 through their respective terminals 20. In a typical application of the present invention, the personal information referencer 72 is a businessman who is in a position of wanting to verify an item in a contract 230 submitted by the personal information registrant 71 by collation with a certificate such as a resident card issued by the city office. The following is a description of a procedure of the present invention followed by the personal information registrant 71 for taking actions ending with a step of letting the personal information referencer 72 verify the validity of the contract 230.

The procedure for utilizing the personal information controlling apparatus 10 includes an inquiry code issuing phase and personal information acquiring phase. At the former phase, the personal information registrant 71 uses the personal information controlling apparatus 10. At the latter phase the personal information referencer 72 utilizes the personal information controlling apparatus 10.

First of all, at the inquiry code issuing phase, the personal information registrant 71 notifies the personal information controlling apparatus 10 of an intention to present personal information on the registrant 71 to a third party. The personal information referencer 72 provides the notice by entering a registrant ID 6201 used as an ID of the registrant and a registrant password 6202 for authenticating the registrant to the personal information controlling apparatus 10 via the terminal 20-2 provided for the personal information registrant 71. After verifying that it is the correct personal information registrant 71 that entered a request for a transaction by checking the validity of the registrant ID 6201 and the registrant password 6202, the personal information controlling apparatus 10 issues an inquiry code to be used as a password for allowing a personal information referencer 72 to acquire personal information on the personal information registrant 71 at the later personal information acquiring phase. The personal information controlling apparatus 10 transmits the issued inquiry code as inquiry code notification data 640 to the terminal 20 as a response to the registrant ID 6201 and the registrant password 6202. Obtaining the inquiry code notification data 640 output via the terminal 20, the personal information registrant 71 records its registrant ID 6201 and the issued inquiry code on the contract 230 and then delivers the contract 230 to the personal information referencer 72.

Then, at the personal information acquiring phase, the personal information referencer 72 enters a registrant ID 6301 used as an ID for identifying personal information and an inquiry code 6302 used as a password for authenticating the personal information referencer 72 to the personal information controlling apparatus 10 via the terminal 20 provided for the personal information referencer 72 by copying the registrant ID 6201 and the issued inquiry code recorded on the contract 230 by the personal information registrant 71 in order to notify the personal information controlling apparatus 10 of an intention to refer to personal information identified by the registrant ID 6301. The personal information controlling apparatus 10 verifies an approval given by the personal information registrant 71 to display the personal information identified by the registrant ID 6301 which is owned by the registrant 71 by authentication of the combination of the registrant ID 6301 and the inquiry code 6302, copies of the registrant ID 6201 and the issued inquiry code respectively recorded on the contract 230. The personal information controlling apparatus 10 transmits the desired personal information identified by the registrant ID 6301 to the terminal 20 as personal information notification data 650 only if a result of the authentication indicates that the inquiry code 6302 has been verified to be indeed the inquiry code issued at the inquiry code issuing phase for the registrant ID 6301. The personal information referencer 72 can then verify the contents of the contract 230 by collating the contents of the contract 230 with the personal information notification data 650 output from the terminal 20.

According to the procedure described above, an inquiry code can be issued only for a specific personal information registrant 71 at the inquiry code issuing phase because it is generally the personal information registrant 71 alone which knows the registrant password 6202. Thus, a third party is not capable of letting the personal information controlling apparatus 10 issue an inquiry code for itself as it pleases. In addition, since the personal information referencer 72 has to obtain the registrant ID 6301 from the personal information registrant 71, the personal information of which is to be referred to, the personal information referencer 72 is not capable of referring to the personal information at the personal information acquiring phase unless the registrant ID 6301 is obtained from the personal information registrant 71. As a result, the only person capable of referencing personal information on the personal information registrant 71 is a personal information referencer 72 which is allowed by the personal information registrant 71 itself to refer to the personal information.

Since the personal information referencer 72 acquires the personal information notification data 650 directly from the personal information controlling apparatus 10, on the other hand, the personal information referencer 72 can believe the contents of the personal information notification data 650 obtained directly from the personal information controlling apparatus 10 as much as it believes a variety of contemporary certificates.

Next, the configuration and the operation of the present embodiment are explained in detail as follows.

In the present embodiment, the personal information controlling apparatus 10 has a configuration including a general computer implemented typically by a personal computer (PC) and an HTTP (Hyper Text Transfer Protocol) server program running on the PC. On the other hand, the terminals 20 used by the personal information registrant 71 and the personal information referencer 72 each have a configuration including a general computer also implemented typically by a PC and a piece of HTTP client software also referred to hereafter as a browser. It should be noted that the personal information registrant 71 and the personal information referencer 72 are referred to hereafter simply as the user, a generic name given to both. In the present embodiment, an HTTP, an existing general communication protocol, is adopted as a communication protocol between the personal information controlling apparatus 10 and the terminals 20. In the following description, a configuration adopting the HTTP as a communication protocol will be explained. It is worth noting, however, that any other general communication protocol or a custom protocol designed specially for communication between the personal information controlling apparatus 10 and the terminals 20 can be adopted as a communication protocol in place of the HTTP as long as the protocol lets a menu screen be displayed on the terminal 20 and allows the user to select processing through a displayed menu screen and to enter data to the terminal 20. For example, the embodiment can employs a protocol of a PC communication type for exchanging text data as it is. In the following description of the present embodiment, it is assumed that an HTTP server program and an HTTP client program also referred to hereafter as a browser are executed on the personal information controlling apparatus 10 and the terminals 20 respectively.

In addition, in the present embodiment, resident card data is picked up as an example of personal information controlled by the personal information controlling apparatus 10. However, data of other types such as that representing certificates of seal impressions can also be controlled as well.

Furthermore, while an inquiry code is generated by using a random number in the present embodiment, an inquiry code can be generated from a source other than a random number by means of a program or hardware adopting any technique as long as the technique can be used for generating data, from which it is difficult for a third party to infer the source.

In addition, in the present embodiment, an inquiry code is issued for each a personal information referencer 72. To put it in detail, a plurality of inquiry codes issued for a specific personal information referencer 72 have values different from each other but inquiry codes issued separately for different personal information referencers 72 may happen to have the same value. For this reason, with pieces of information put in a control table along with inquiry codes associated with the pieces of information on a one-to-one basis, the control table is searched for a specific piece of information by using a pair of an inquiry code and a registrant ID for identifying a personal information registrant 71 as a key instead of an inquiry code alone.

Figure 1:
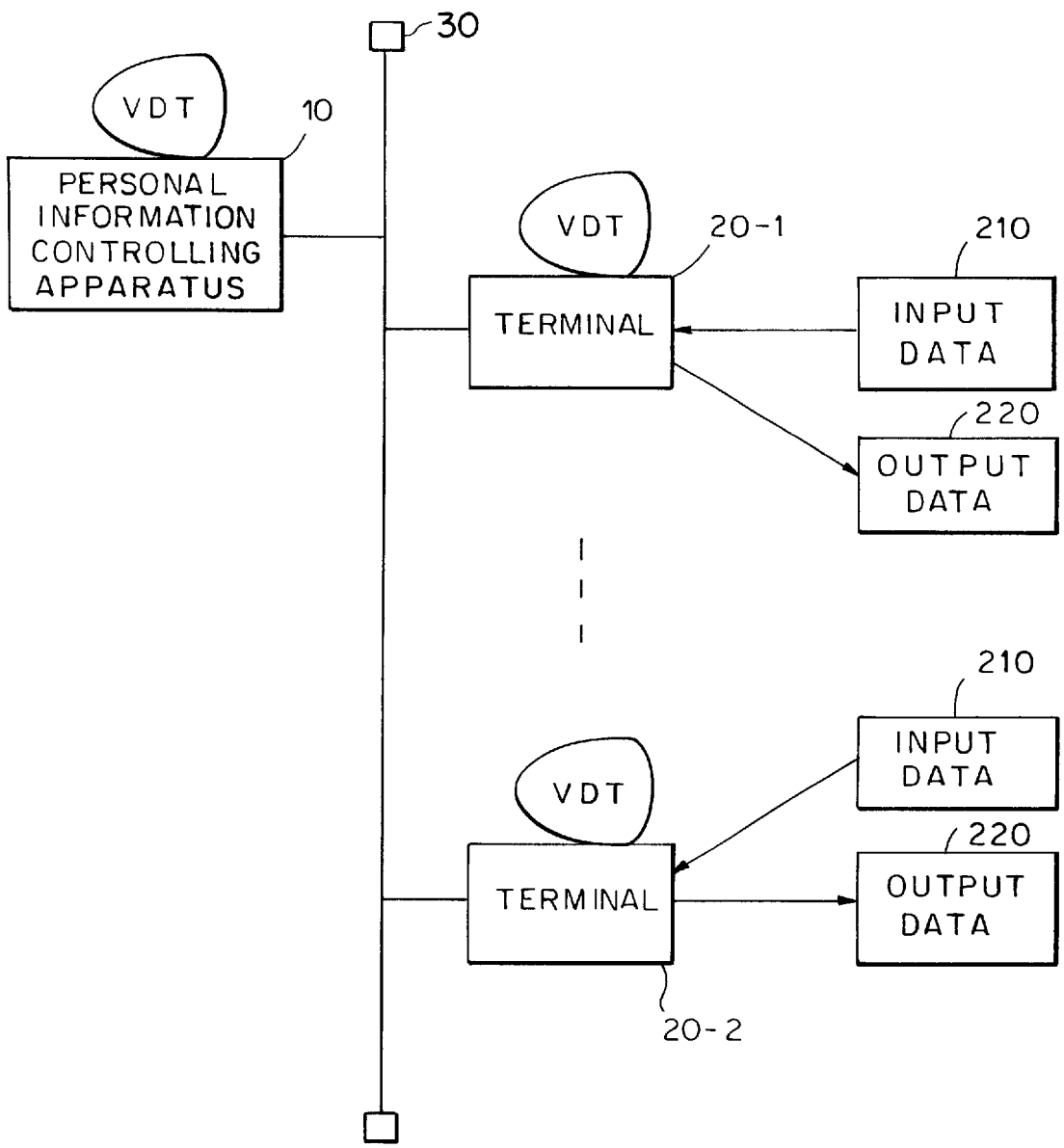
FIG. 1 is a diagram illustrating the configuration of a personal information controlling system of the present invention.

FIG. 1 is a diagram illustrating the configuration of a personal information controlling system provided by the present invention. As illustrated in the FIG. 1, the personal information controlling system includes the personal information controlling apparatus 10, the terminals 20-1 and 20-2 and a network 30. Each of Terminals 20-1 and 20-2 includes a video display terminal (VDT). The personal information controlling apparatus 10 is connected to the terminals 20-1 and 20-2 by the network 30. The personal information controlling apparatus 10 carries out processing to issue an inquiry code or processing to output personal information depending upon input data 210 entered by the user by operating the terminal 20-1, 20-2 and presents output data 220 to the user.

As described above, the personal information processing apparatus 10 and the terminal 20-1, 20-2 are each implemented by a general computer such as personal computer which is referred to hereafter simply as a PC and a program running on the computer.

Figure 2:
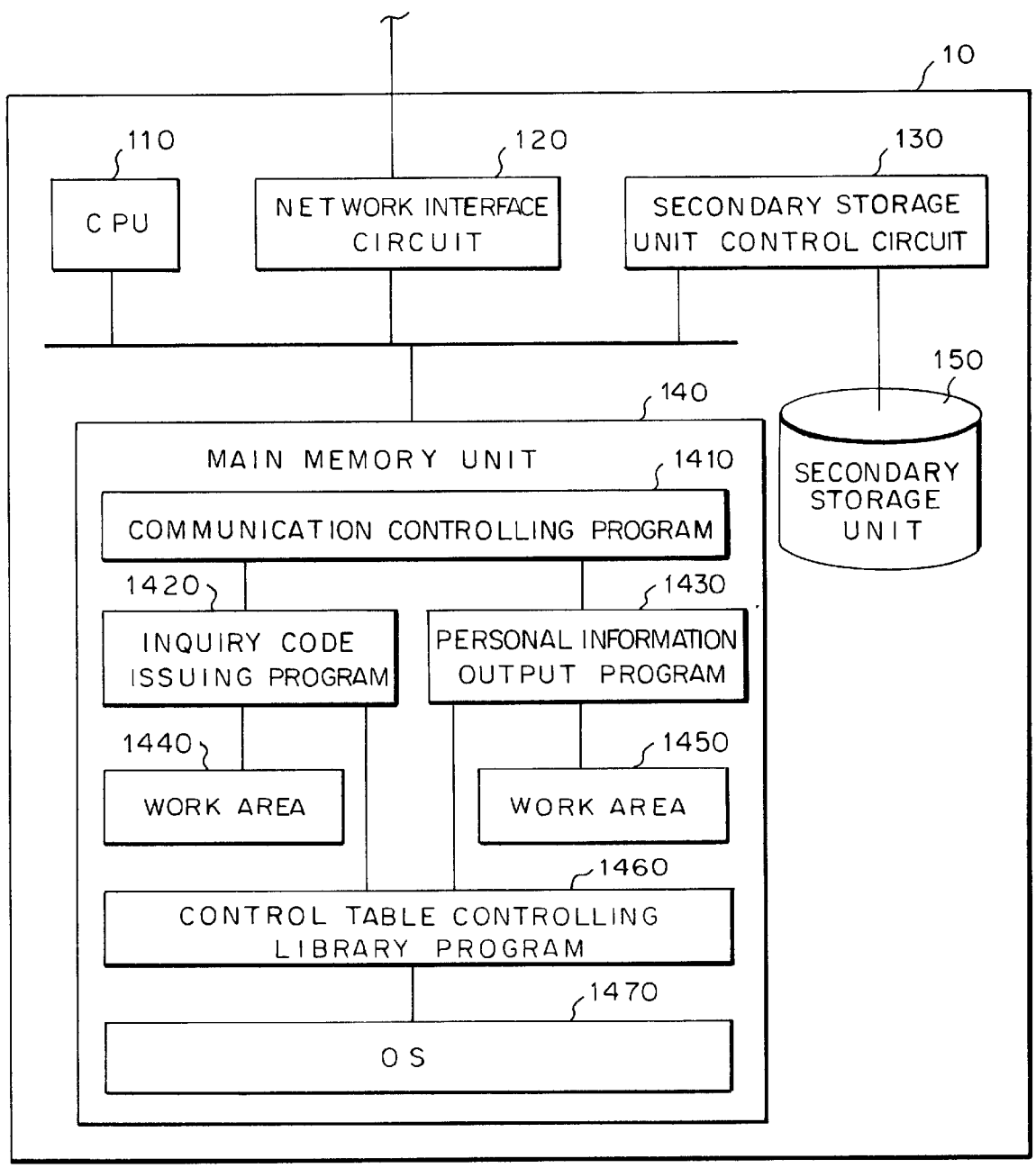
FIG. 2 is a diagram illustrating the configuration of a personal information controlling apparatus 10 employed in the personal information controlling system illustrated in FIG. 1.

FIG. 2 is a diagram illustrating the configuration of the personal information controlling apparatus 10. As illustrated in the FIG. 2, the personal information controlling apparatus 10 includes a CPU 110, a network interface circuit 120, a secondary storage unit controlling circuit 130, a main memory unit 140 and a secondary storage unit 150. In accordance with instructions issued by the CPU 110, the network interface circuit 120 exchanges messages with the browser of the terminal 20 as illustrated in FIG. 43 or one of terminals 20-1, and 20-2 as illustrated in FIG. 1 through the network 30. Connected to the secondary storage unit 150, the secondary storage unit controlling circuit 130 inputs and outputs data from and to the secondary storage unit 150 in accordance with instructions issued by the CPU 110. The main memory unit 140 includes an area for storing an inquiry code issuing program 1420 of FIG. 13 for issuing an inquiry code in accordance with an instruction given by the personal information registrant 71 by operating the terminal 20; a work area 1440 used by the inquiry code issuing program 1420; an area for storing personal information output program 1430 of FIG. 16 for outputting personal information in accordance with an instruction given by the personal information referencer 72 by operating the terminal 20; a work area 1450 used by the personal information output program 1430; an area for storing a communication controlling program 1410 for carrying out processing to transmit various kinds of screen data to the terminal 20 in accordance with inputs received from the terminal 20 and for carrying out processing to activate the inquiry code issuing program 1420 and the personal information output program 1430 and to transmit results output by the inquiry code issuing program 1420 and the personal information output program 1430 to the terminal 20; an area for storing a control table controlling library program 1460 for controlling a variety of control tables stored in the secondary storage unit 150 in accordance with instructions given by the inquiry code issuing program 1420 and the personal information output program; and an area for storing an OS 1470 for controlling hardware resources of the personal information controlling apparatus 10.

The OS 1470 is activated automatically at the activation of the personal information controlling apparatus 10, invoking the communication controlling program 1410. Once activated, the communication controlling program 1410 enters a state to wait for an input to be transmitted from the terminal 20.

In the configuration described above, a general OS available in the market can be used as the OS 1470 and a data base controlling program available in the market can be used as the control table controlling library program 1460. A general HTTP server program available in the market can be used as the communication controlling program 1410. On the other hand, the inquiry code issuing program 1420 illustrated in FIG. 13 and the personal information output program 1430 illustrated in FIG. 16 are each implemented by a program for carrying out processing explained in detail in the following description of the present embodiment.

When the inquiry code issuing program 1420 and the personal information output program 1430 carry out processing, from an operation to refer to a variety of control tables stored in the secondary storage unit 150 to an operation to update the control tables, the inquiry code issuing program 1420 and the personal information output program 1430 call the control table controlling library program 1460. Since the call to the control table controlling library program 1460 is self-explanatory, the details of the call is not explained. Similarly, system calls to services rendered by the OS 1470 from the inquiry code issuing program 1420, the personal information output program 1430 and the communication controlling program 1410 cited above are not explained.

Figure 13:
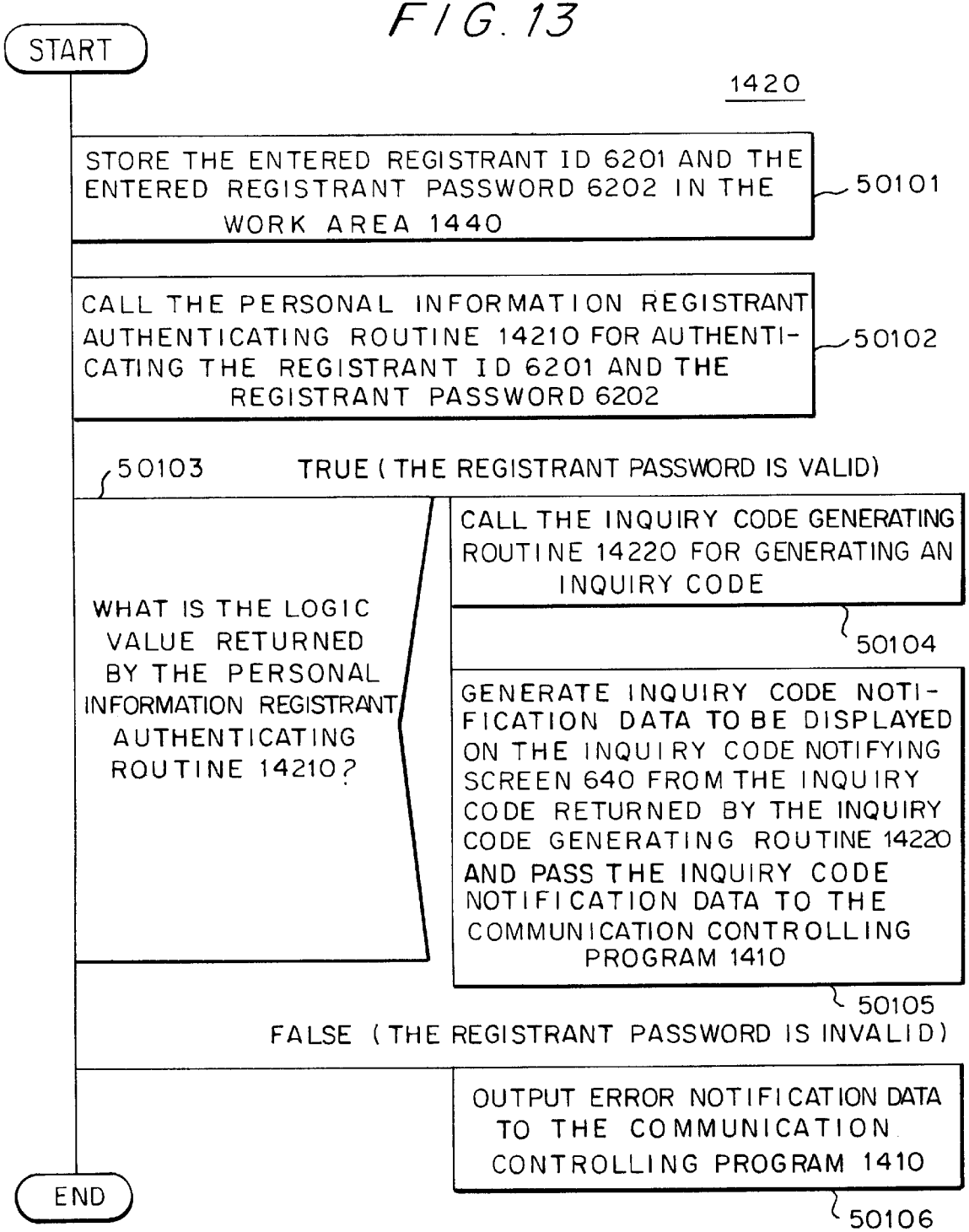
FIG. 13 is a PAD diagram illustrating pieces of processing carried out by execution of an inquiry code issuing program 1420 stored in the main memory unit 140 illustrated in FIG. 2.

When the personal information registrant 71 makes a request for processing to be carried out to issue an inquiry code in accordance with a guidance displayed on the screen of the terminal 20, the inquiry code issuing program 1420 illustrated in FIG. 13 is activated by the communication controlling program 1410, generating an inquiry code based on input data 210 entered as part of the request by the personal information registrant 71 via the terminal 20. The inquiry code issuing program 1420 then converts the inquiry code generated thereby into inquiry code notification data having a format that can be displayed by the terminal 20 and passes the inquiry code notification data to the communication controlling program 1410. The communication controlling program 1410 finally outputs the inquiry code notification data to the terminal 20 for displaying the data to the personal information registrant 71 in response to the request made thereby.

Figure 16:
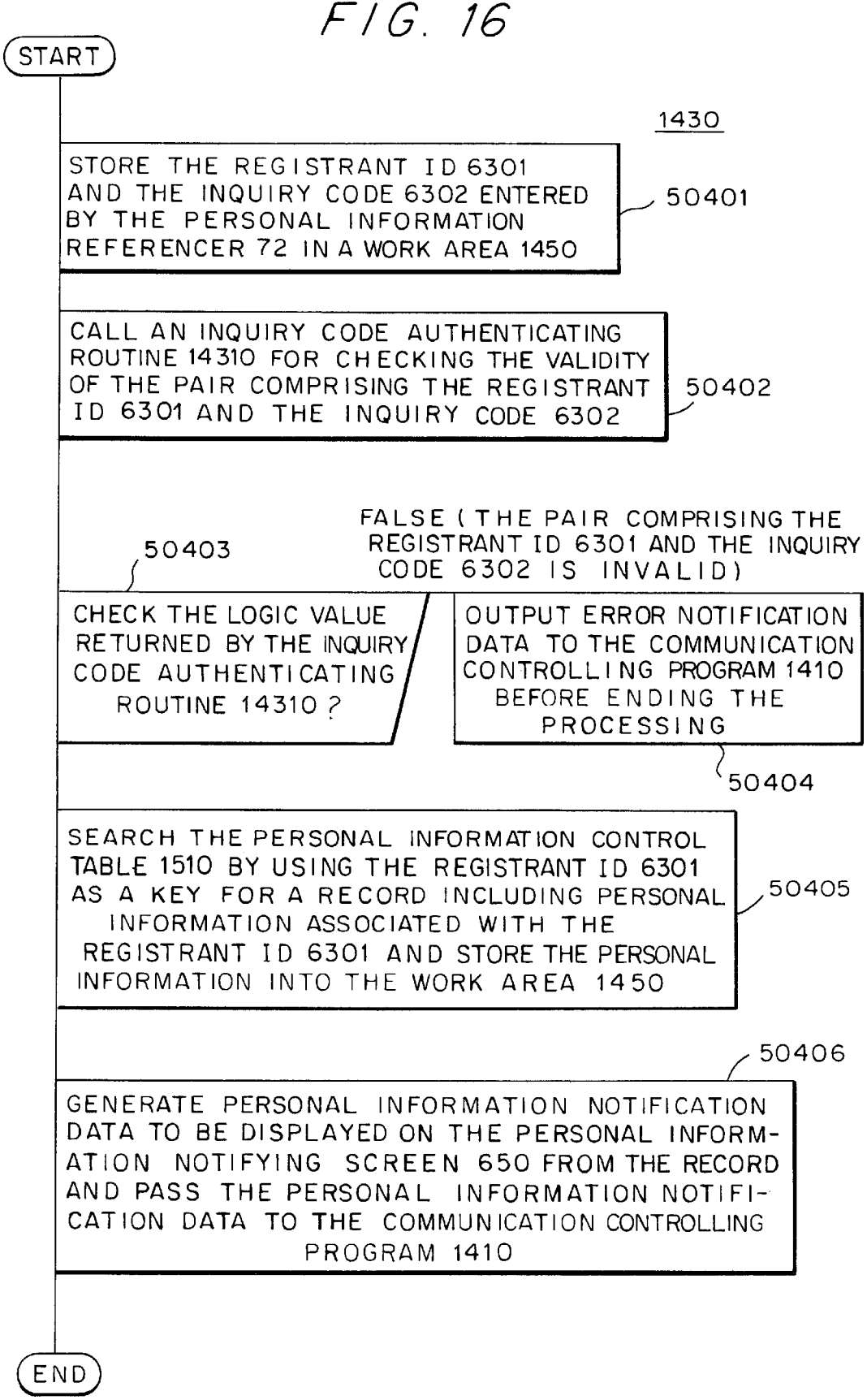
FIG. 16 is a PAD diagram illustrating pieces of processing carried out by execution of a personal information output program 1430 stored in the main memory unit 140.

When the personal information referencer 72 makes a request for processing to be carried out to display personal information in accordance with a guidance displayed on the screen of the terminal 20, the personal information output program 1430 illustrated in FIG. 16 is activated by the communication controlling program 1410, searching a control table for a piece of personal information corresponding to data entered by the personal information referencer 72 via the terminal 20 as part of the request. The personal information output program 1430 then converts the personal information generated thereby into personal information notification data having a format that can be displayed by the terminal 20 and passes the personal information notification data to the communication controlling program 1410. The communication controlling program 1410 finally outputs the personal information notification data to the terminal 20 for displaying the data to the personal information referencer 72 in response to the request made thereby.

Figures 3, 4, 5, 6:
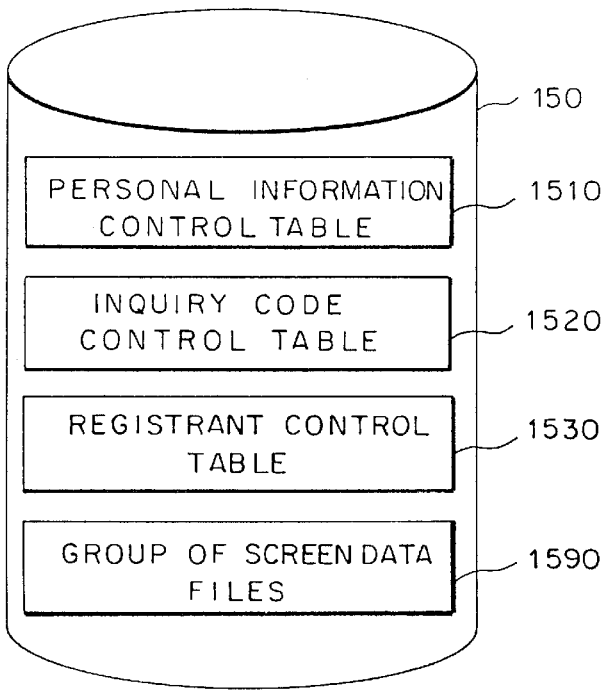
FIG. 3 is a diagram illustrating the configuration of a secondary storage unit 150 employed in the personal information controlling apparatus 10 illustrated in FIG. 2.
FIG. 4 is a diagram illustrating the configuration of a personal information control table 1510 stored in the secondary storage unit 150 illustrated in FIG. 3.
FIG. 5 is a diagram illustrating the configuration of an inquiry code control table 1520 stored in the secondary storage unit 150.
FIG. 6 is a diagram illustrating the configuration of a registrant control table 1530 stored in the secondary storage unit 150.

Next, information stored in the secondary storage unit 150 is explained by referring to FIG. 3. In the present embodiment, information stored in the secondary storage unit 150 includes: personal information control table 1510 illustrated in FIG. 4, that is, a control table used for storing resident card data; an inquiry code control table 1520 illustrated in FIG. 5 used for controlling issued inquiry codes; a registrant control table 1530 illustrated in FIG. 6 used for controlling registrant IDs and registrant passwords issued to personal information registrants 71; and a screen data file group 1590 including a plurality of files each used for storing a template of screen data to be transmitted by the communication controlling program 1410 to the terminal 20 and displayed thereon. It should be noted that, in the present embodiment, resident card data is picked up as an example of personal information controlled by the personal information controlling apparatus 10. Therefore, the personal information control table 1510 illustrated in FIG. 4 is used for storing resident card data. However, personal information of other types such as that representing certificates of seal impressions can also be stored in the personal information control table 1510 with the same structure.

The structure of each of the control tables cited above is described as follows.

FIG. 4 is a diagram illustrating the structure of the personal information control table 1510. The personal information control table 1510 is a control table used for storing and controlling pieces of personal information handled by the personal information controlling apparatus 10. In the present embodiment, resident card data is picked up as an example of personal information stored in the control table. As illustrated in the FIG. 4, each record in the personal information control table 1510 includes a registrant ID field 1511 for storing a registrant ID used as an identification of a personal information registrant 71, an address field 1512 used for storing resident card data of the personal information registrant 71 and a householder name field 1513. The registrant ID field 1511 is used as a key for searching the personal information control table 1510 for resident card data of a personal information registrant 71 identified by an identification stored in the registrant ID field 1511 in the processing carried out to display personal information. Not related to the present invention, however, explanation of a program and an operational procedure for cataloging and updating data to and in the personal information control table 1510 is omitted.

FIG. 5 is a diagram illustrating the structure of the inquiry code control table 1520. The inquiry code control table 1520 is a control table used for controlling inquiry codes that have been already issued. As illustrated in FIG. 5, each record in the inquiry code control table 1520 includes a registrant ID field 1521 used for storing a registrant ID of a personal information registrant 71 who made a request for processing to be carried out to issue an inquiry code and an inquiry code field 1522 for storing an inquiry code issued in the requested processing carried out to issue an inquiry code. A pair of a registrant ID field 1521 and an inquiry code field 1522 is used as a key to search the inquiry code control table 1520 for a pair of a registrant ID and an inquiry code which are stored as a record in the inquiry code control table 1520 and match the key in the processing carried out to display personal information. If such a record exists in the inquiry code control table 1520, the pair of a registrant ID and an inquiry code specified by a personal information referencer 72 is judged to be valid and the registrant ID is used as a key for searching the personal information table 1510 illustrated in FIG. 4 for a piece of personal information to be displayed. Such a record is created in the processing carried out to issue an inquiry code and is deleted after being referred to in the processing carried out to display personal information.

FIG. 6 is a diagram illustrating the structure of the registrant control table 1530. The registrant control table 1530 is a control table used for associating a registrant ID for identifying a personal information registrant 71 and a registrant password for authenticating the personal information registrant 71 and used for controlling such registrant IDs and such registrant passwords. As illustrated in the FIG. 6, each record in the registrant control table 1530 includes a registrant ID field 1531 used for storing a registrant ID serving as an identification unique to a personal information registrant 71 and a registrant password field 1532 used for storing a registrant password assigned to the personal information registrant 71, a password associated with the registrant ID. The registrant ID field 1531 is used as a key to search the registrant control table 1530 for a registrant password field 1532 associated with the key. If a registrant password entered by a personal information registrant 71 during the processing carried out to issue an inquiry code matches a password found in the search, the personal information registrant 71 is authenticated as a valid user.

Figure 7:
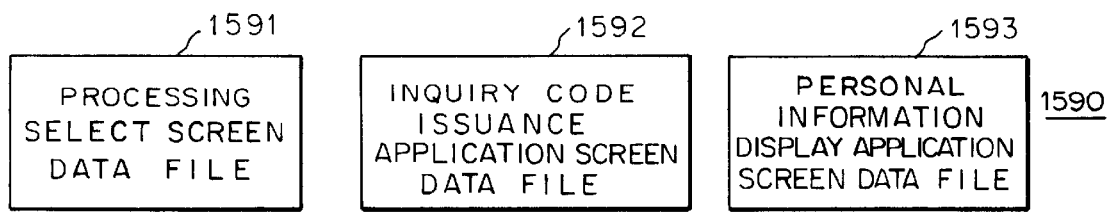
FIG. 7 is a diagram illustrating the structure of a screen data file group 1590 stored in the secondary storage unit 150.

FIG. 7 is a diagram illustrating the structure of the screen data file group 1590. The screen data file group 1590 is a collection of files each for storing a template of screen data to be transmitted by the communication controlling program 1410 to the terminal 20 and displayed thereon. To be more specific, the screen data file group 1590 includes a processing select screen data file 1591, an inquiry code issuance application screen data file 1592 and a personal information display application screen data file 1593. The processing select screen data file 1591 is a file corresponding to a processing select screen 610 illustrated in FIG. 8, that is, a screen used for requesting the user of the terminal 20 to select either the processing to issue an inquiry code or the processing to display personal information as processing to be carried out. The inquiry code issuance application screen data file 1592 is a file corresponding to an inquiry code issuance application screen 620 illustrated in FIG. 9, that is, a screen which is displayed when the processing carried out to issue an inquiry code has been selected by the user through the processing select screen 610 as processing to be carried out. On the other hand, the personal information display application screen data file 1593 is a file corresponding to personal information display application screen 630 illustrated in FIG. 10, that is, a screen which is displayed when the processing carried out to display personal information has been selected by the user through the processing select screen 610 as processing to be carried out.

In the present embodiment, the processing select screen data file 1591, the inquiry code issuance application screen data file 1592 and the personal information display application screen data file 1593 are each implemented as an HTML page file, the contents of which are described in an HTML (Hypertext Markup Language) language. A link function provided by the HTML language allows a displayed screen to be switched from one to another when the user selects a button displayed on the screen. Formats used to display the processing select screen data file 1591, the inquiry code issuance application screen data file 1592 and the personal information display application screen data file 1593 on the terminal 20 are explained as follows.

Figure 8:
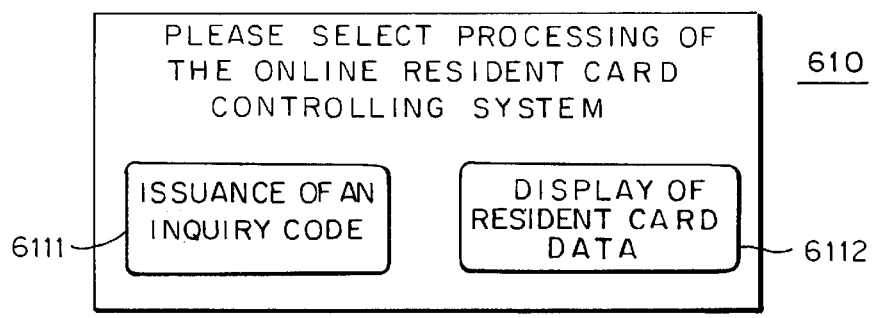
FIG. 8 is a diagram illustrating the configuration of a processing select screen 610.

FIG. 8 is a diagram illustrating the configuration of the processing select screen 610 displayed on the terminal 20, a screen representing the contents of the processing select screen data file 1591. The processing select screen 610 is a screen which is initially displayed on the terminal 20 when the user utilizes the personal information controlling apparatus 10 through the terminal 20. As illustrated in FIG. 8, the processing select screen 610 includes an explanatory text for urging the user to select either the processing to issue an inquiry code or the processing to display personal information as processing to be carried out, an inquiry code issuance button 6111 used for selecting the processing to be carried out to issue an inquiry code and personal information output button 6112 used for selecting the processing to be carried out to display personal information. The inquiry code issuance button 6111 and the personal information output button 6112 are each provided as an HTML link serving as a command requesting the browser that other screen data be acquired. To be more specific, the inquiry code issuance button 6111 and the personal information output button 6112 are links to the inquiry code issuance application screen data file 1592 and the personal information display application screen data file 1593 respectively. When the user selects one of the inquiry code issuance button 6111 and the personal information output button 6112, the browser running on the terminal 20 requests the communication controlling program 1410 to transmit the contents of a screen data file associated with (that is, linked to) the selected button and displays the contents of the transmitted screen data file on the terminal 20.

Figure 9:
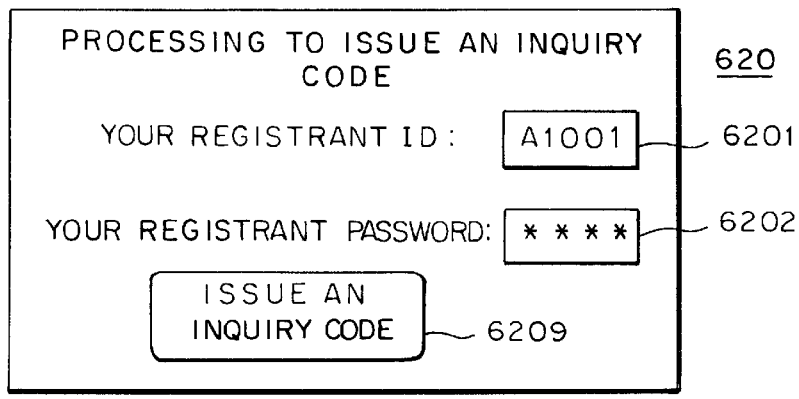
FIG. 9 is a diagram illustrating the configuration of an inquiry code issuance application screen 620.

FIG. 9 is a diagram illustrating the configuration of the inquiry code issuance application screen 620, that is, a screen displaying the contents of the inquiry code issuance application screen data file 1592 on the terminal 20. The inquiry code issuance application screen 620 is displayed when the user of the terminal 20, that is, the personal information registrant 71, selects the processing to be carried out to issue an inquiry code by specifying the inquiry code issuance button 6111 displayed on the processing select screen 610 illustrated in FIG. 8. As illustrated in FIG. 9, the inquiry code issuance application screen 620 includes a registrant ID input line 6201 used by the personal information registrant 71 for entering a registrant ID, a registrant password input line 6202 used by the personal information registrant 71 for entering a registrant password and an inquiry code issuing button 6209 to be pressed by the personal information registrant 71 to request the terminal 20 that the entered registrant ID and the entered registrant password be transmitted to the personal information controlling apparatus 10. The registrant ID input line 6201, the registrant password input line 6202 and the inquiry code issuing button 6209 are each designed in a data input form of the HTML which serves as a command to execute a predetermined program in order to transmit the entered registrant ID and the entered registrant password to the communication controlling program 1410. After the entered registrant ID and the entered registrant password have been transmitted as instructed by the personal information registrant 71 through the specification of the inquiry code issuing button 6209, the entered registrant ID and the entered registrant password are marked on the inquiry code issuance application screen data file 1592 so that the inquiry code issuing program 1420 illustrated in FIG. 13 is activated.

Figure 10:
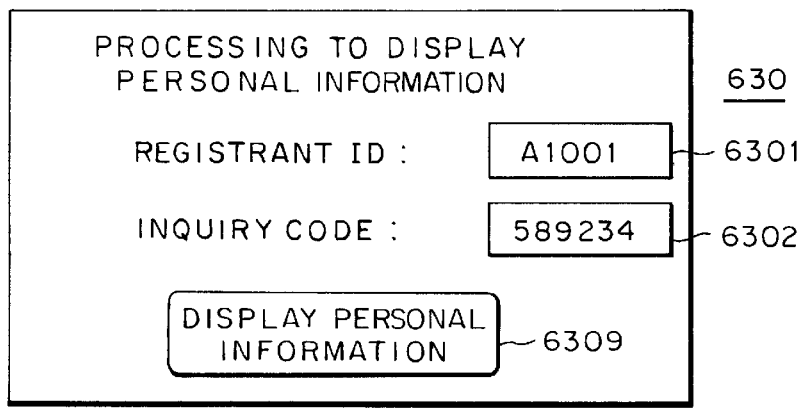
FIG. 10 is a diagram illustrating the configuration of a personal information display application screen 630.

FIG. 10 is a diagram illustrating the configuration of the personal information display application screen 630, that is, a screen displaying the contents of the personal information display application screen data file 1593 on the terminal 20. The personal information display application screen 630 is displayed when the user of the terminal 20, that is, the personal information referencer 72, selects the processing to be carried out to display personal information by specifying the personal information output button 6112 displayed on the processing select screen 610 illustrated in FIG. 8. As illustrated in FIG. 10, the personal information display application screen 630 includes a registrant ID input line 6301 used by the personal information referencer 72 for entering a registrant ID, an inquiry code input line 6302 used by the personal information referencer 72 for entering an inquiry code obtained by the personal information registrant 71 as a result of carrying out the processing to issue an inquiry code and personal information output button 6309 to be pressed by the personal information referencer 72 to request the terminal 20 that the entered registrant ID and the entered registrant password be transmitted to the personal information controlling apparatus 10. It is assumed that the personal information referencer 72 has been notified of the inquiry code by the personal information registrant 71. The registrant ID input line 6301, the registrant password input line 6302 and the personal information output button 6309 are each designed in a data input form of the HTML which serves as a command to execute a predetermined program in order to transmit the entered registrant ID and the entered inquiry code to the communication controlling program 1410. After the entered registrant ID and the entered inquiry code have been transmitted as instructed by the personal information referencer 72 through the specification of the personal information output button 6309, the entered registrant ID and the entered inquiry code are marked on the personal information display application screen data file 1593 so that the personal information output program 1430 illustrated in FIG. 16 is activated.

FIG. 11 is a diagram illustrating the configuration of an inquiry code notifying screen 640 for displaying inquiry code notification data output by the inquiry code issuing program 1420 illustrated in FIG. 13 on the terminal 20. The inquiry code notifying screen 640 is displayed after the personal information registrant 71 has entered a registrant ID 6201 and a registrant password 6202 to the inquiry code issuance application screen 620 illustrated in FIG. 9 and then selected the inquiry code issuing button 6209. As illustrated in FIG. 11, an issued inquiry code is displayed on the inquiry code notifying screen 640.

FIG. 12 is a diagram illustrating the configuration of a personal information notifying screen 650 for displaying personal information notification data output by the personal information output program 1430 illustrated in FIG. 16 on the terminal 20. The personal information notifying screen 650 is displayed after the personal information referencer 72 has entered a registrant ID 6301 and an inquiry code 6302 to the personal information display application screen 630 illustrated in FIG. 10 and then selected the personal information output button 6309. As illustrated in the FIG. 12, the desired personal information is displayed on the personal information notifying screen 650.

Next, processing carried out by the inquiry code issuing program 1420 illustrated in FIG. 13 is explained. When the personal information registrant 71 enters a registrant ID 6201 and a registrant password 6202 to the inquiry code issuance application screen 620 illustrated in FIG. 9 and then selects the inquiry code issuing button 6209, the inquiry code issuing program 1420 is activated by the communication controlling program 1410. Inputs to the inquiry code issuing program 1420 illustrated in FIG. 13 are a registrant ID 6201 and a registrant password 6202 entered by the personal information registrant 71, the user of the terminal 20, to the registrant ID line and the registrant password line respectively on the inquiry code issuance application screen 620. On the other hand, an output produced by the inquiry code issuing program 1420 is inquiry code notification data to be displayed on the inquiry code notifying screen 640 illustrated in FIG. 11 in the case of successful processing carried out to issue an inquiry code, or an error notification data to be displayed on an error notifying screen not illustrated in the figures in the event of an error. The inquiry code issuing program 1420 carries out the processing to issue an inquiry code successfully only if the registrant password 6202 is found valid. The output of the inquiry code issuing program 1420 is transmitted by the communication controlling program 1410 to the terminal 20. Pieces of processing carried out by execution of the inquiry code issuing program 1420 stored in the main memory unit 140 are explained in concrete terms by referring to a PAD diagram illustrated in FIG. 13.

First of all, at a step 50101 of the PAD diagram illustrated in FIG. 13, the inquiry code issuing program 1420 stores the registrant ID 6201 and the registrant password 6202 entered by the personal information registrant 71 in a work area 1440.

Figure 14:
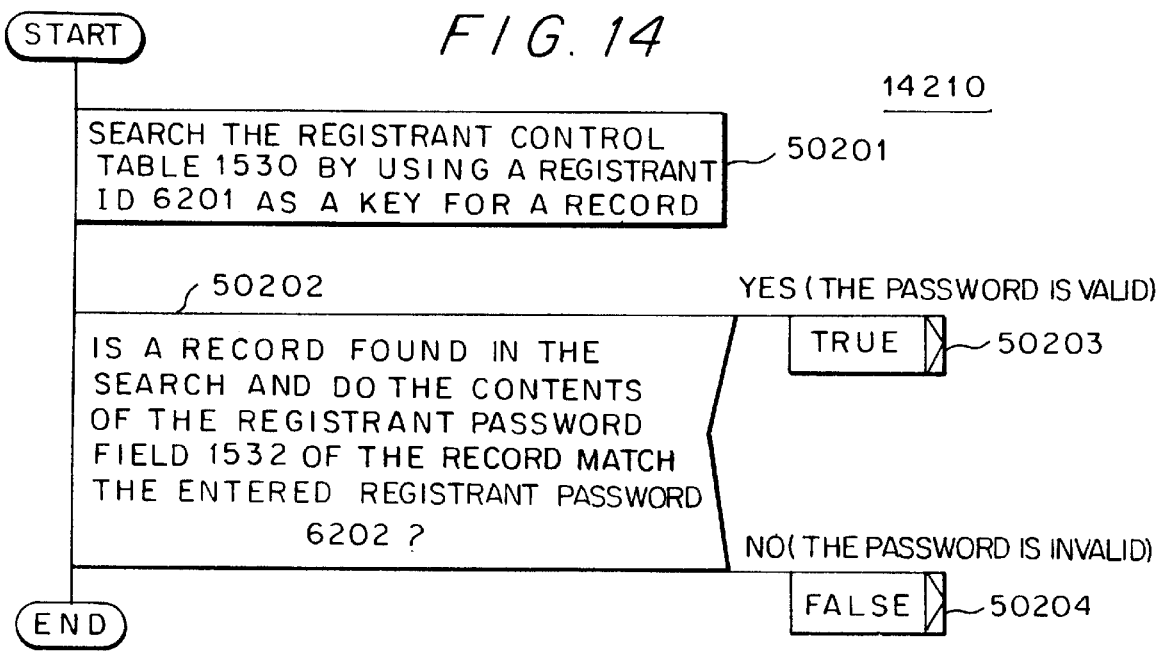
FIG. 14 is a PAD diagram illustrating pieces of processing carried out by execution of a personal information registrant authenticating routine 14210 stored in the main memory unit 140.

At a step 50102, the inquiry code issuing program 1420 calls a personal information registrant authenticating routine 14210 illustrated in FIG. 14 for checking the validity of the pair including the registrant ID 6201 and the registrant password 6202. The personal information registrant authenticating routine 14210 also stored in the main memory unit 140 passes a logic value indicating whether or not the pair including the registrant ID 6201 and the registrant password 6202 is valid to the calling inquiry code issuing program 1420 as a return value.

At a step 50103, the inquiry code issuing program 1420 checks the logic value returned by the personal information registrant authenticating routine 14210. If the logic value is TRUE, that is, if the pair including the registrant ID 6201 and the registrant password 6202 is valid, the inquiry code issuing program 1420 executes steps 50104 and 50105. If the logic value is FALSE, that is, if the pair including the registrant ID 6201 and the registrant password 6202 is invalid, on the other hand, the inquiry code issuing program 1420 executes a step 50106.

Figure 15:
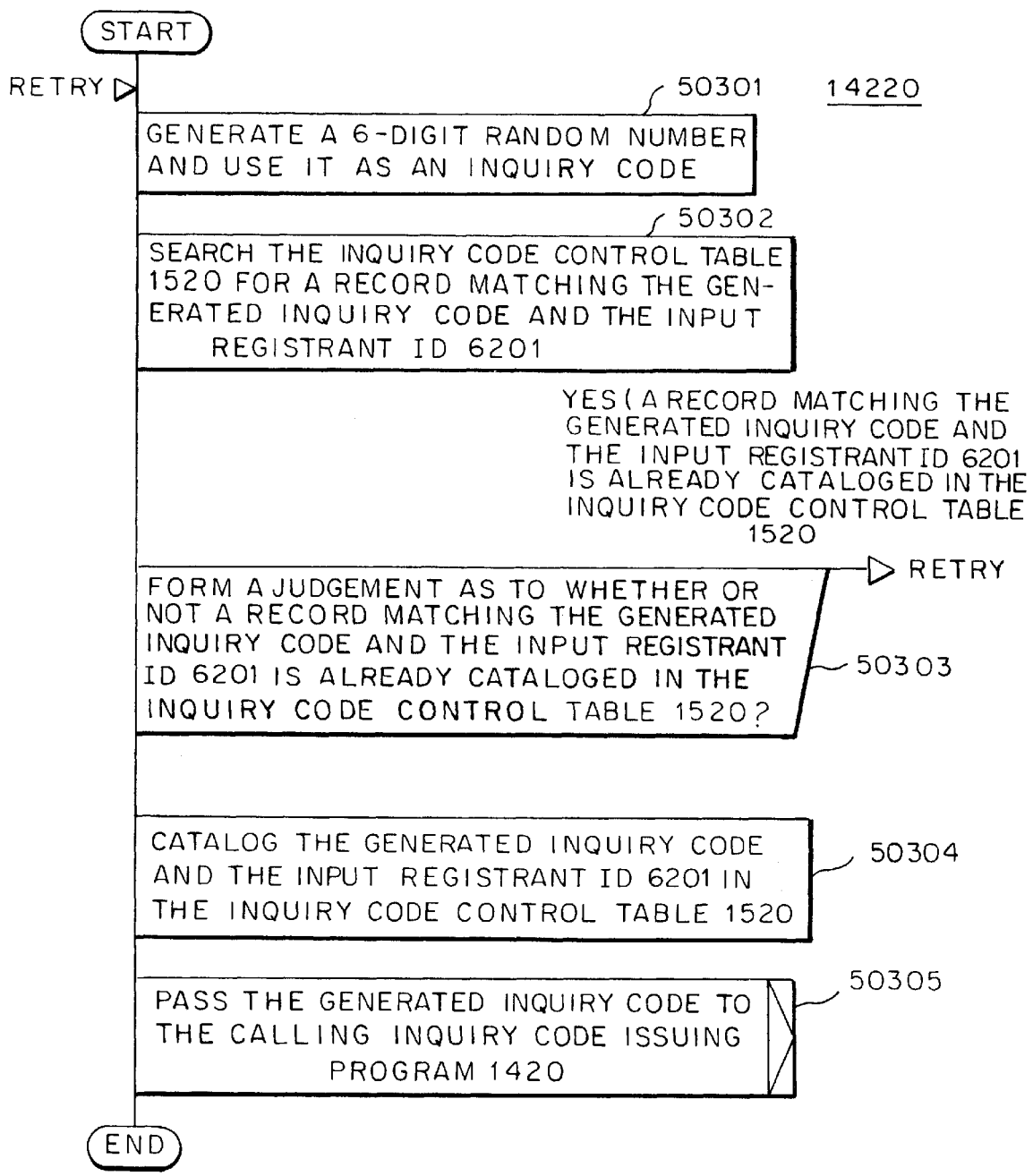
FIG. 15 a personal information registrant authenticating routine 14210 is a PAD diagram illustrating pieces of processing carried out by execution of an inquiry code generating routine 14220 stored in the main memory unit 140.

At the step 50104, the inquiry code issuing program 1420 calls an inquiry code generating routine 14220 illustrated in FIG. 15 for generating an inquiry code corresponding to the registrant ID 6201. The inquiry code generating routine 14220 also stored in the main memory unit 140 generates an inquiry code and passes the inquiry code to the calling inquiry code issuing program 1420 as a return value.

At the step 50105, the inquiry code issuing program 1420 generates inquiry code notification data to be displayed on the inquiry code notifying screen 640 illustrated in FIG. 11 from the inquiry code returned by the inquiry code generating routine 14220 and passes the inquiry code notification data to the communication controlling program 1410.

At the step 50106, the inquiry code issuing program 1420 outputs error notification data not illustrated in the figures to the communication controlling program 1410 to report the fact that the requested processing carried out to issue an inquiry code is rejected due to an invalid pair including the registrant ID 6201 and the registrant password 6202 before ending the processing.

As described above, the inquiry code issuing program 1420 is activated by the communication controlling program 1410 when the personal information registrant 71 enters a registrant ID 6201 and a registrant password 6202 to the inquiry code issuance application screen 620 illustrated in FIG. 9 and then selects the inquiry code issuing button 6209. An inquiry code is generated and inquiry code notification data is output to the communication controlling program 1410 only if the registrant ID 6201 and the registrant password 6202 are found valid. That is, the only person who is capable of requesting the inquiry code issuing program 1420 to generate an inquiry code by operating the terminal 20 is a personal information registrant 71 who knows the valid registrant password 6202. As a result, a third party is not capable of requesting the inquiry code issuing program 1420 to generate an inquiry code by pretending to be the personal information registrant 71 unless the third party also knows the valid registrant password 6202.

The following is a description of pieces of processing carried out by execution of the personal information registrant authenticating routine 14210 illustrated in FIG. 14 and the inquiry code generating routine 14220 illustrated in FIG. 15, which are called by the inquiry code issuing program 1420 illustrated in FIG. 13 to authenticate a personal information registrant 71 and to generate an inquiry code respectively, in concrete terms.

The description begins with an explanation of the personal information registrant authenticating routine 14210. The personal information registrant authenticating routine 14210 authenticates a personal information registrant 71 through a search of the registrant control table 1530 illustrated in FIG. 6 by using a registrant ID 6201 read out from the work area 1440 as a key for a record and then comparing the contents of the registrant password field 1532 of the record with a registrant password 6202 read out from the work area 1440. Steps of processing carried out by the personal information registrant authenticating routine 14210 are explained by referring to a PAD diagram illustrated in FIG. 14.

First of all, at a step 50201 of the PAD diagram illustrated in FIG. 14, the personal information registrant authenticating routine 14210 searches the registrant control table 1530 by using a registrant ID 6201 read out from the work area 1440 as a key for a record.

At a step 50202, the personal information registrant authenticating routine 14210 returns a TRUE logic value to the calling inquiry code issuing program 1420 illustrated in FIG. 13 if a record is found in the search carried out at the step 50201 and the contents of the registrant password field 1532 of the record match the registrant password 6202 read out from the work area 1440. If a record is not found in the search carried out at the step 50201 from the beginning, that is, if the registrant ID 6201 entered by the personal information registrant 71 and stored in the work area 1440 is not valid, or if a record is found but the contents of the registrant password field 1532 of the record do not match the registrant password 6202 read out from the work area 1440, that is, if the pair including the registrant ID 6201 and the registrant password 6202 entered by the personal information registrant 71 and stored in the work area 1440 is not valid, on the other hand, the personal information registrant authenticating routine 14210 returns a FALSE logic value to the calling inquiry code issuing program 1420.

Next, the inquiry code generating routine 14220 illustrated in FIG. 15, that is, the second routine called by the inquiry code issuing program 1420 illustrated in FIG. 13, is explained. The inquiry code generating routine 14220 generates an inquiry code then, after cataloging the code in the inquiry code control table 1530 illustrated in FIG. 6, passes the inquiry code to the calling inquiry code issuing program 1420 as a return value. The inquiry code generating routine 14220 is called by the inquiry code issuing program 1420 after the registrant ID 6201 and the registrant password 6202 have been authenticated. In the present embodiment, an inquiry code is generated from a random number. It should be noted, however, that an inquiry code can also be generated from a source other than a random number by a program or hardware. At any rate, any technique for generating an inquiry code can be adopted as long as it is hard for a third party to infer the source from the resulting inquiry code. Steps of processing carried out by the inquiry code generating routine 14220 are explained by referring to a PAD diagram illustrated in FIG. 15.

First of all, at a step 50301 of the PAD diagram illustrated in FIG. 15, the inquiry code generating routine 14220 generates a 6-digit random number and uses it as an inquiry code.

At a step 50302, the inquiry code generating routine 14220 searches the inquiry code control table 1520 illustrated in FIG. 5 for a record matching the inquiry code generated at the step 50301 and the registrant ID 6201 read out from the work area 1440.

At a step 50303, the inquiry code generating routine 14220 forms a judgment as to whether or not a record matching the inquiry code generated at the step 50301 and the registrant ID 6201 is already cataloged in the inquiry code control table 1520 illustrated in FIG. 5. If a record matching the inquiry code generated at the step 50301 and the registrant ID 6201 is already cataloged in the inquiry code control table 1520 illustrated in FIG. 5, the control of execution is returned to the step 50301 to repeat the processing in order to avoid duplication of records cataloged in the inquiry code control table 1520.

At a step 50304, the inquiry code generating routine 14220 catalogs the inquiry code generated at the step 50301 and the registrant ID 6201 read out from the work area 1440 in the inquiry code control table 1520.

At a step 50305, the inquiry code generating routine 14220 passes the inquiry code generated at the step 50301 to the calling inquiry code issuing program 1420 illustrated in FIG. 13 as a return value.

As described above, the processing to issue an inquiry code is carried out by execution of the inquiry code issuing program 1420 illustrated in FIG. 13 which calls the personal information registrant authenticating routine 14210 illustrated in FIG. 14 and the inquiry code generating routine 14220 illustrated in FIG. 15.

Next, pieces of processing carried out by execution of the personal information output program 1430 illustrated in FIG. 16 are explained. The personal information output program 1430 is activated by the communication controlling program 1410 when the personal information referencer 72 enters a registrant ID 6301 and an inquiry code 6302 to the personal information display application screen 630 illustrated in FIG. 10 and then selects the personal information output button 6309. Inputs to the personal information output program 1430 are the registrant ID 6301 and the inquiry code 6301 entered by the personal information referencer 72 to the registrant ID field and the inquiry code field respectively on the personal information display application screen 630. On the other hand, an output produced by the personal information output program 1430 is personal information notification data to be displayed on the personal information notifying screen 650 illustrated in FIG. 12 in the case of successful processing carried out to display personal information, or an error notification data to be displayed on an error notifying screen not illustrated in the figures in the event of an error. The personal information output program 1430 illustrated in FIG. 16 carries out the processing to display personal information successfully only if the registrant ID 6201 and the inquiry code 6302 are found valid. The output of the personal information output program 1430 illustrated in FIG. 16 is transmitted by the communication controlling program 1410 to the terminal 20. Pieces of processing carried out by execution of the personal information output program 1430 stored in the main memory unit 140 are explained in concrete terms by referring to a PAD diagram illustrated in FIG. 16.

First of all, at a step 50401 of the PAD diagram illustrated in FIG. 16, the personal information output program 1430 stores the registrant ID 6301 and the inquiry code 6302 entered by the personal information referencer 72 in a work area 1450.

Figure 17:
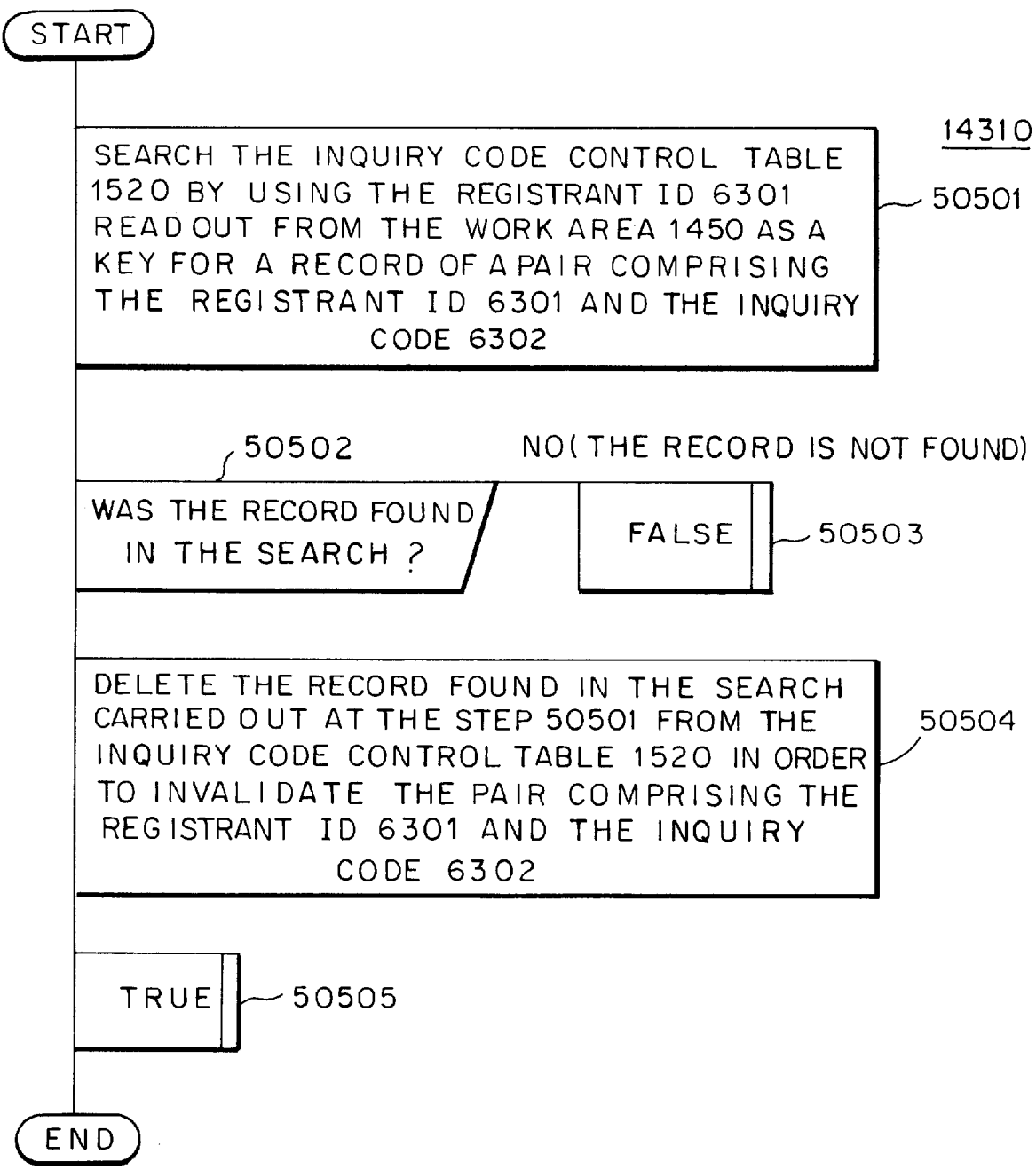
FIG. 17 is a PAD diagram illustrating pieces of processing carried out by execution of an inquiry code authenticating routine 14310 stored in the main memory unit 140.

At a step 50402, the personal information output program 1430 calls an inquiry code authenticating routine 14310 illustrated in FIG. 17 for checking the validity of the pair including the registrant ID 6301 and the inquiry code 6302. The inquiry code authenticating routine 14310 also stored in the main memory unit 140 passes a logic value indicating whether or not the pair including the registrant ID 6301 and the inquiry code 6302 is valid to the calling personal information output program 1430 as a return value.

At a step 50403, the personal information output program 1430 checks the logic value returned by the inquiry code authenticating routine 14310. If the logic value is TRUE, that is, if the pair including the registrant ID 6301 and the inquiry code 6302 is valid, the personal information output program 1430 executes steps 50405 and 50406. If the logic value is FALSE, that is, if the pair including the registrant ID 6301 and the inquiry code 6302 is invalid, of the other hand, the personal information output program 1430 executes a step 50404. At the step 50404, the personal information output program 1430 outputs error notification data not illustrated in the figures to the communication controlling program 1410 to report the fact that the requested processing to be carried out to display personal information is rejected due to an invalid pair including the registrant ID 6301 and the inquiry code 6302 before ending the processing.

At the step 50405, the personal information output program 1430 searches the personal information control table 1510 illustrated in FIG. 4 by using the registrant ID 6301 as a key for a record including personal information associated with the registrant ID 6301. The personal information found in the search is read out from the personal information control table 1510 and stored into the work area 1450.

At the step 50406, the personal information output program 1430 generates personal information notification data to be displayed on the personal information notifying screen 650 illustrated in FIG. 12 from the personal information read out from the work area 1450 and passes the personal information notification data to the communication controlling program 1410.

As described above, the personal information output program 1430 illustrated in FIG. 16 is activated by the communication controlling program 1410 when the personal information referencer 72 enters a registrant ID 6301 and an inquiry code 6302 to the personal information display application screen 630 illustrated in FIG. 10 and then selects the personal information output button 6309. Personal information corresponding to the registrant ID 6301 is generated and personal information notification data for the personal information is output to the communication controlling program 1410 only if the registrant ID 6301 and the inquiry code 6302 are found valid. That is, the only person who is capable of requesting the personal information output program 1430 to generate personal information by operating the terminal 20 is a personal information referencer 72 who knows the valid inquiry code 6302. As a result, a third party is not capable of requesting the personal information output program 1430 to generate personal information by pretending to be the personal information referencer 72 unless the third party also knows the valid inquiry code 6302.

The following is a description of pieces of processing carried out by execution of the inquiry code authenticating routine 14310 illustrated in FIG. 17, which is called by the personal information output program 1430 illustrated in FIG. 16, and a used record deleting routine 14320 not illustrated in the figures in concrete terms. The used record deleting routine 14320 is also called by the inquiry code authenticating routine 14310.

The description begins with an explanation of the inquiry code authenticating routine 14310 illustrated in FIG. 17. The inquiry code authenticating routine 14310 authenticates a pair including a registrant ID 6301 and an inquiry code 6302 stored in the work area 1450 by searching the inquiry code control table 1520 illustrated in FIG. 5 by using the registrant ID 6301 read out from the work area 1450 as a key for a record and then comparing the contents of the inquiry code field 1522 of the record with the inquiry code 6302 read out from the work area 1450. Contents of the inquiry code field 1522 matching the inquiry code 6302 indicate that the inquiry code 6302 is valid. In this case, a TRUE return value is passed to the calling personal information output program 1430 illustrated in FIG. 16. On the other hand, contents of the inquiry code field not matching the inquiry code 6302 indicate that the inquiry code 6302 is invalid. In this case, a FALSE return value is passed to the personal information output program 1430 illustrated in FIG. 16. In addition, in the case of a valid inquiry code 6302, the record having an inquiry code field with contents matching the valid inquiry code 6302 is deleted from the inquiry code control table 1520 illustrated in FIG. 5 by calling the used record deleting routine 14320 so that this valid inquiry code 6302 is no longer valid. Steps of processing carried out by the inquiry code authenticating routine 14310 stored in the main memory unit 140 are explained by referring to a PAD diagram illustrated in FIG. 17.

First of all, at a step 50501 of the PAD diagram illustrated in FIG. 17, the inquiry code authenticating routine 14310 searches the inquiry code control table 1520 illustrated in FIG. 5 by using the registrant ID 6301 read out from the work area 1450 as a key for a record including the registrant ID 6301 and the inquiry code 6302.

At a step 50502, the inquiry code authenticating routine 14310 forms a judgment as to whether or not the pair including the registrant ID 6301 and the inquiry code 6302 stored in the work area 1450 is valid. To put it in detail, if a record is not found in the search carried out at the step 50501 from the beginning, that is, if the registrant ID 6301 entered by the personal information referencer 72 and stored in the work area 1450 is not correct, or if a record is found but the contents of the inquiry code field 1532 of the record do not match the inquiry code 6302 read out from the work area 1450, that is, if the pair including the registrant ID 6301 and the inquiry code 6302 entered by the personal information referencer 72 and stored in the work area 1450 is not valid, on the other hand, the inquiry code authenticating routine 14310 returns a FALSE logic value to the calling personal information output program 1430 illustrated in FIG. 16 at a step 50503.

Otherwise, the outcome of the judgment formed at the step 50502 indicates that the pair including the registrant ID 6301 and the inquiry code 6302 stored in the work area 1450 is valid. In this case, the record found in the search carried out at the step 50501 is deleted from the inquiry code control table 1520 illustrated in FIG. 5 by the used record deleting routine 14320 which is called by the inquiry code authenticating routine 14310 at a step 50504 in order to invalidate the pair including the registrant ID 6301 and the inquiry code 6302 stored in the work area 1450.

At a step 50505, the inquiry code authenticating routine 14310 returns a TRUE logic value to the calling personal information output program 1430 illustrated in FIG. 16 to indicate that the pair including the registrant ID 6301 and the inquiry code 6302 stored in the work area 1450 is valid.

The following is a description of operations which are carried out by the personal information controlling apparatus 10 with the configuration described above when the personal information registrant 71 and the personal information referencer 72 each make use of the present invention to request the apparatus 10 to display personal information of the personal information registrant 71 according to operational procedure provided for the user of the personal information controlling apparatus 10.

The description begins with an explanation of an operational procedure followed by the personal information registrant 71 to make a request for issuance of an inquiry code. Before the personal information registrant 71 operates the terminal 20, the person in charge of the operation of the personal information controlling apparatus 10 has cataloged the personal information such as the resident card, the registrant ID and the registrant password of the personal information registrant 71. To be more specific, a pair including the registrant ID and the personal information is cataloged in the personal information control table 1510 illustrated in FIG. 4 while a pair including the registrant ID and the registrant password is cataloged in the registrant control table 1530 illustrated in FIG. 6. Not related directly to the present invention, however, the explanation of processing to catalog these pieces of information is omitted from the following description.

After the preparatory processing to catalog these pieces of information has been completed, the personal information registrant 71 activates the browser of the terminal 20 and then enters the address of the personal information controlling apparatus 10 in the network 30. The processing select screen 610 illustrated in FIG. 8 is then displayed by the browser on the terminal 20. Here, when the personal information registrant 71 selects the inquiry code issuance button 6111, the inquiry code issuance application screen 620 illustrated in FIG. 9 is displayed. The personal information registrant 71 then enters the registrant ID and the registrant password issued for the personal information registrant 71 itself to the registrant ID input line 6201 and the registrant password input line 6202 respectively on the inquiry code issuance application screen 620. Subsequently, the personal information registrant 71 selects the inquiry code issuing button 6209 on the inquiry code issuance application screen 620. These operations carried out by the personal information registrant 71 cause the browser to transmit the input registrant ID and the input registrant password to the communication controlling program 1410 which, in turn, activates the inquiry code issuing program 1420 illustrated in FIG. 13, passing the registrant ID and the registrant password to the inquiry code issuing program 1420. The inquiry code issuing program 1420 then calls the personal information registrant authenticating routine 14210 illustrated in FIG. 14 to search the registrant control table 1530 illustrated in FIG. 6 by using the input registrant ID as a key for a record. If the record found in the search includes a registrant password matching the input registrant password, that is, if the pair including the input registrant ID and the input registrant password is found valid, the inquiry code issuing program 1420 calls the inquiry code generating routine 14220 illustrated in FIG. 15 to generate an inquiry code and outputs the inquiry code to the communication controlling program 1410 as inquiry code notification data which can be displayed by the browser on the terminal 20. At the same time, the inquiry code issuing program 1420 catalogs a pair including the input registrant ID and the generated inquiry code in the inquiry code control table 1520 illustrated in FIG. 5 as a new record. The communication controlling program 1410 then transmits the inquiry code notification data to the terminal 20 in response to the request for the issuance of an inquiry code. The browser of terminal 20 finally displays the inquiry code notification data as an inquiry code notifying screen 640 illustrated in FIG. 11. The personal information registrant 71 then makes a note of the inquiry code displayed on the inquiry code notifying screen 640 by hand writing or records the inquiry code by making a hard copy of the inquiry code notifying screen 640 which can be produced by typically printing the inquiry code notifying screen 640 by means of a printer. If no record including the input registrant ID is found in the search of the registrant control table 1530 or if such a record is found but the registrant password included in the record does not match the input registrant password, that is, if the pair including the registrant ID and the registrant password entered by the personal information registrant 71 according to the procedure described above is found invalid, on the other hand, in place of the inquiry code notification data, the inquiry code issuing program 1420 generates error notification data which is displayed on the terminal 20 as an error notifying screen not illustrated in the figures.

When the pieces of processing described above are completed normally, the personal information registrant 71 notifies the personal information referencer 72 of its own registrant ID and the inquiry code issued by the personal information controlling apparatus 10 as explained above. The personal information referencer 72 then acquires personal information of the personal information registrant 71 by using the registrant ID and the inquiry code received from the registrant 71 in accordance with a procedure described as follows.

First of all, the personal information referencer 72 activates the browser of the terminal 20 and then enters the address of the personal information controlling apparatus 10 in the network 30. The processing select screen 610 illustrated in FIG. 8 is then displayed on the browser. Here, when the personal information referencer 72 selects the personal information output button 6112, the personal information display application screen 630 illustrated in FIG. 10 is displayed. The personal information referencer 72 then enters the registrant ID and the inquiry code received from the personal information registrant 71 to the registrant ID input line 6301 and the inquiry code input line 6302 respectively on the personal information display application screen 630. Subsequently, the personal information referencer 72 selects the personal information output button 6309 on the personal information display application screen 630. These operations carried out by the personal information referencer 72 cause the browser to transmit the input registrant ID and the input inquiry code to the communication controlling program 1410 which, in turn, activates the personal information output program 1430 illustrated in FIG. 16, passing the registrant ID and the inquiry code to the personal information output program 1430. The personal information output program 1430 then calls the inquiry code authenticating routine 14310 illustrated in FIG. 17 to search the inquiry code control table 1520 illustrated in FIG. 5 by using the input registrant ID as a key for a record. If the record found in the search includes an inquiry code matching the input inquiry code, that is, if the pair including the input registrant ID and the input inquiry code is found valid, the personal information output program 1430 searches the personal information control table 1510 illustrated in FIG. 4 by using the input registrant ID as a key for personal information of the personal information referencer 72 and outputs the personal information to the communication controlling program 1410 as personal information notification data which can be displayed by the browser on the terminal 20. The communication controlling program 1410 then transmits the personal information notification data to the terminal 20 in response to the request for the display of personal information. The browser of terminal 20 finally displays the personal information notification data as a personal information notifying screen 650 illustrated in FIG. 12. In this way, the personal information referencer 72 can acquire the personal information displayed on the personal information notifying screen 650.

If no record including the input registrant ID is found in the search of the inquiry code control table 1520 or if such a record is found but the inquiry code included in the record does not match the input inquiry code, that is, if the pair including the registrant ID and the inquiry code entered by the personal information referencer 72 to the registrant ID input line 6301 and the inquiry code input line 6302 respectively according to the procedure described above is found invalid, on the other hand, the personal information output program 1430 generates error notification data which is displayed on the terminal 20 as an error notifying screen not illustrated in the figures in place of the personal information notification data notifying screen 650.

In addition, in the present embodiment, if the pair including the input registrant ID and the input inquiry code is found valid, the personal information output program 1430 also deletes the record including the input registrant ID and the input inquiry code from the inquiry code control table 1520 by means of the used record deleting routine 14320 called by the inquiry code authenticating routine 14310 illustrated in FIG. 17 in order to make the inquiry code invalid besides the operation to generate personal information notification data described above. In this way, an inquiry code issued by the inquiry code issuing program 1420 illustrated in FIG. 13 can be used by the personal information referencer 72 only once. As a result, after the personal information referencer 72 has used the inquiry code, a third party is by no means capable of abusing the inquiry code even if the inquiry code inadvertently leaks out to the third party.

The embodiment described above solves the two problems addressed by the present invention as follows:

(1) Only a personal information referencer 72 specified by a personal information registrant 71 is capable of acquiring personal information of the personal information registrant 71 in an online way.

(2) It is not necessary to exchange electronic data between a personal information registrant 71 and a personal information referencer 72 specified by the personal information registrant 71.

Second Embodiment

The first embodiment described so far has a problem that any user is inevitably capable of acquiring personal information associated with a registrant ID if the user can obtain the combination of the registrant ID and an inquiry code issued for the registrant ID. It is thus absolutely necessary to prevent an issued inquiry code from being known by a third party.

In order to solve the problem described above, there has been provided a second embodiment that is capable of preventing a third party from acquiring personal information of a personal information registrant 71 without the permission of the personal information registrant 71 even if the third party knows the combination of the registrant ID assigned to the personal information registrant 71 and an inquiry code issued for the registrant ID. During the inquiry code issuing processing, the personal information registrant 71 is requested to specify a personal information referencer 72 whereas, during the processing carried out to display personal information of the personal information registrant 71, the personal information is displayed only after a personal information referencer 72 operating the terminal 20 has been verified to be the personal information referencer 72 specified by the personal information registrant 71 during the processing carried out to issue an inquiry code.

The second embodiment is described in detail by referring to FIGS. 18–26 as follows. Since the second embodiment basically has the same configuration as the first embodiment, only differences between them are explained.

Figure 18:
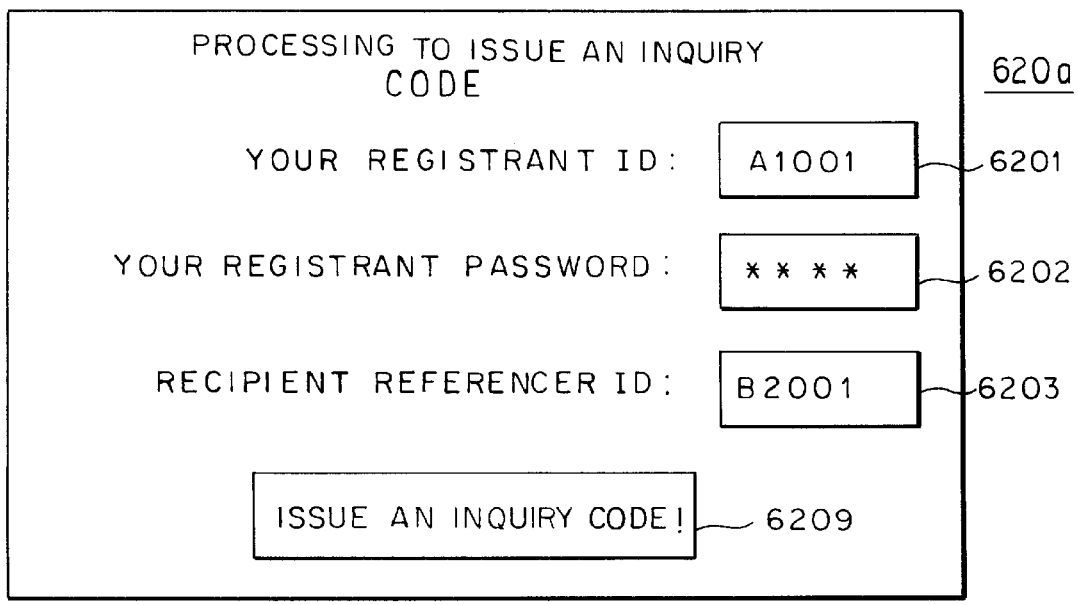

FIG. 18 is a diagram illustrating the configuration of an inquiry code issuance application screen 620a illustrated in FIG. 18 of the second embodiment. As illustrated in the figure, the inquiry code issuance application screen 620a is the same as the inquiry code issuance application screen 620 of the first embodiment illustrated in FIG. 9 except that the former has an additional referencer ID input line 6203 to be used by the personal information registrant 71 for specifying a desired personal information referencer 72 who is expected to refer to personal information of the personal information registrant 71.

Figure 19:
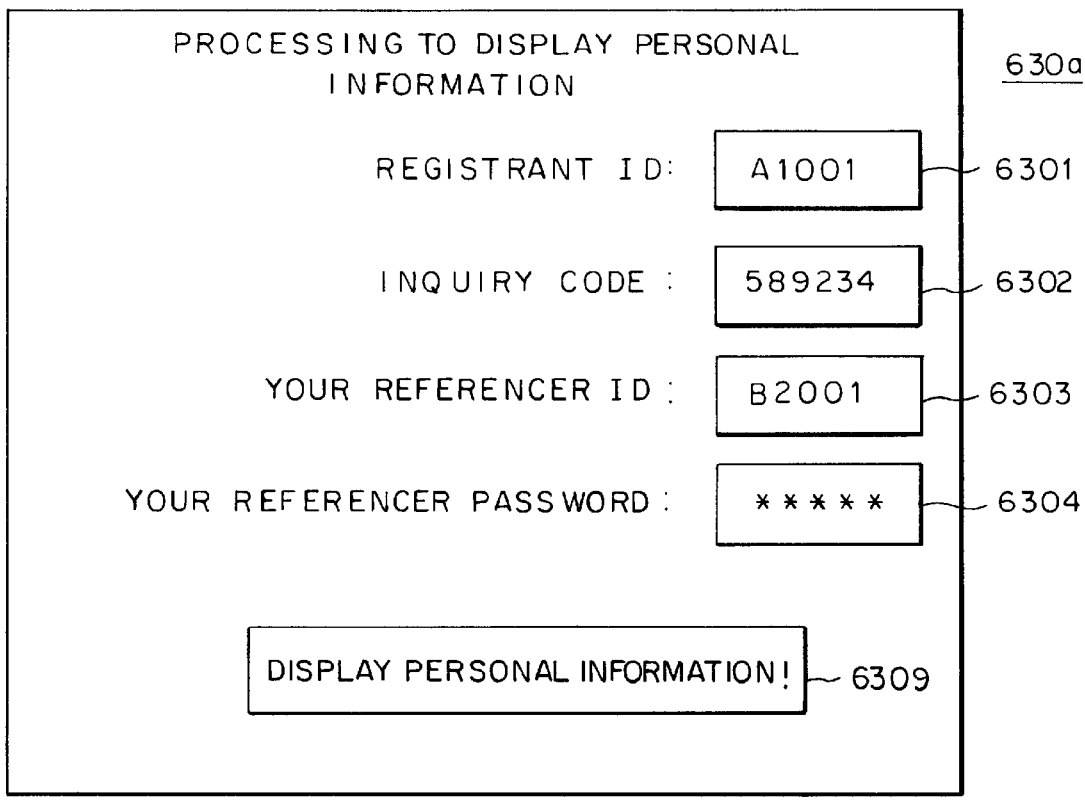

FIG. 19 is a diagram illustrating the configuration of a personal information display application screen 630a of the second embodiment. As illustrated in the figure, the personal information display application screen 630a is the same as the personal information display application screen 630 of the first embodiment illustrated in FIG. 10 except that the former has an additional referencer ID input line 6303 and an additional referencer password input line 6304 to be used by the personal information referencer 72 for specifying the referencer ID and the referencer password assigned to the personal information referencer 72 by operating the terminal 20.

FIG. 20 is a diagram illustrating the structure of the referencer control table 1540 stored in the secondary storage unit 150 of the second embodiment. Much like the registrant control table 1530 illustrated in FIG. 6, the referencer control table 1540 is a control table used for associating a referencer ID for identifying a personal information referencer 72 and a referencer password for authenticating the personal information referencer 72 and used for controlling such referencer IDs and such referencer passwords. Each record in the referencer control table 1540 illustrated in FIG. 20 includes a referencer ID field 1541 used for storing a referencer ID serving as an identification unique to a personal information referencer 72 and a referencer password field 1542 used for storing a referencer password assigned to the personal information referencer 72, that is, a password associated with the referencer ID.

FIG. 21 is a diagram illustrating the configuration of a referencer specification control table 1550 stored in the secondary storage unit 150 of the second embodiment. Each record in the referencer specification control table 150 includes a referencer ID and a pair of a registrant ID and an inquiry code associated with the referencer ID. The registrant ID, the inquiry code and the referencer ID are stored in a registrant ID field 1551, an inquiry code field 1552 and a referencer ID field 1553 respectively of the record to which they pertain.

Next, the processing carried out to issue an inquiry code of the second embodiment is explained. Unlike the first embodiment, the personal information registrant 71 is requested to enter also a referencer ID of a personal information referencer 72 who will refer to personal information of the personal information registrant 71 in addition to a registrant ID and a registrant password of the personal information registrant 71. An issued inquiry code is then cataloged along with the input registrant ID and the input referencer ID in the referencer specification control table 1550 illustrated in FIG. 21 as a record associating the pair including the input registrant ID and the issued inquiry code with the input referencer ID.

Figure 22:
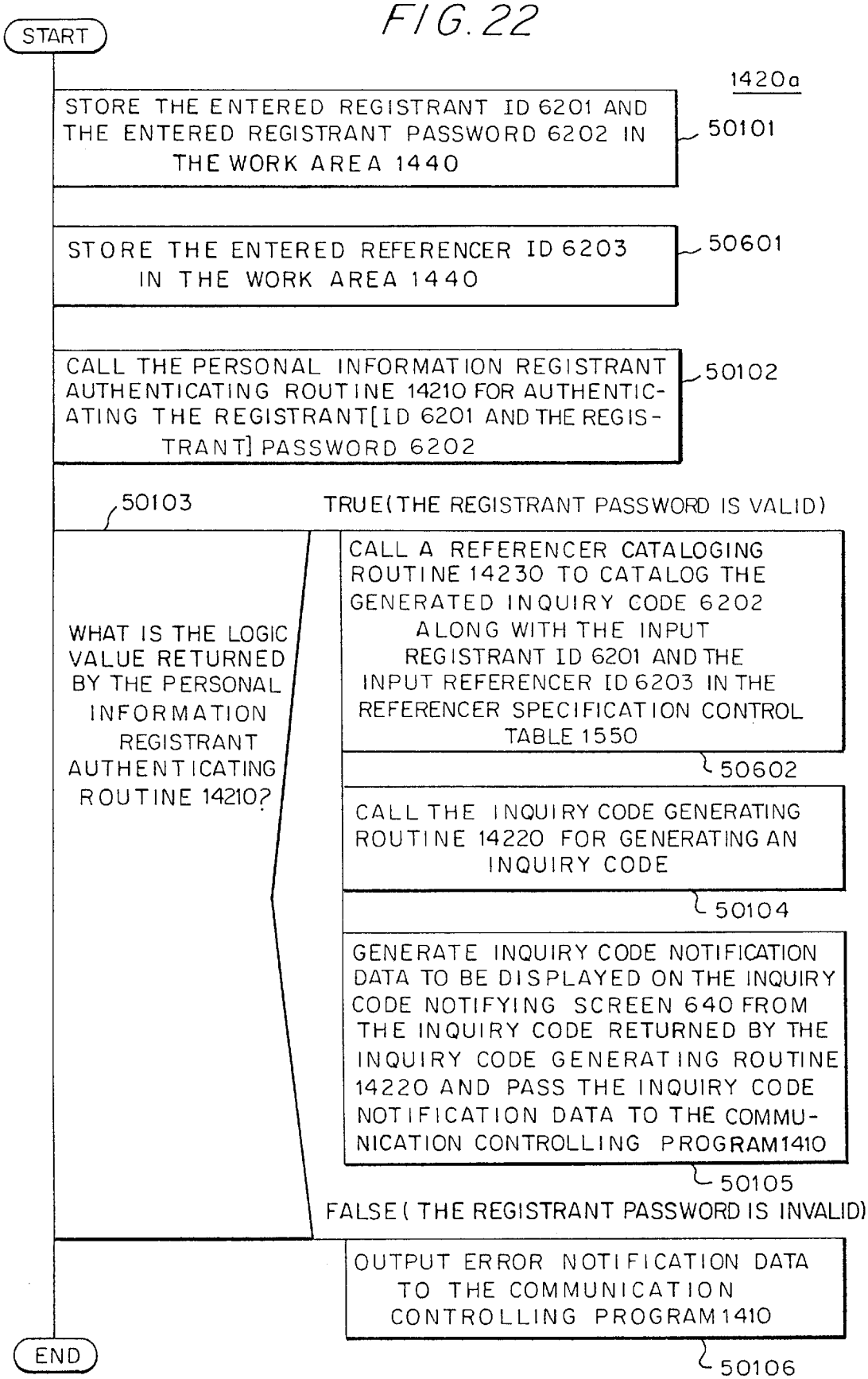
FIG. 22 is a PAD diagram illustrating pieces of processing carried out by execution of an inquiry code issuing program 1420a stored in the main memory unit 140.

FIG. 22 is a PAD diagram illustrating pieces of processing carried out by execution of an inquiry code issuing program 1420*a* stored in the main memory unit 140 of the second embodiment. In the inquiry code issuing program 1420*a*, an inquiry code is generated and then cataloged along with an input registrant ID and an input referencer ID in the referencer specification control table 1550 illustrated in FIG. 21 as a record associating a pair including the input registrant ID and the issued inquiry code with the input referencer ID by adding the following steps to the inquiry code issuing program 1420 of the first embodiment illustrated in FIG. 13.

At a step 50601, the inquiry code issuing program 1420*a* stores a referencer ID 6203 entered by the personal information registrant 71 in the work area 1440.

At a step 50602, the inquiry code issuing program 1420*a* calls a referencer cataloging routine 14230 stored in the main memory unit 140 to catalog the generated inquiry code along with the input registrant ID 6201 and the input referencer ID 6203 in the referencer specification control table 1550 illustrated in FIG. 21 as a record associating the pair including the input registrant ID 6201 and the generated inquiry code with the input referencer ID 6203.

Figure 23:
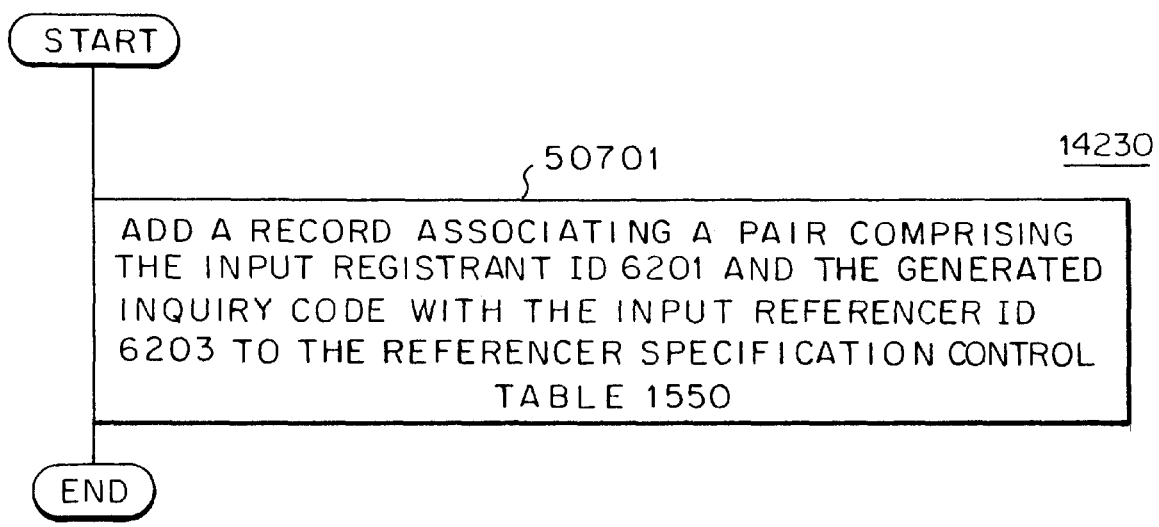
FIG. 23 is a PAD diagram illustrating pieces of processing carried out by execution of a referencer cataloging routine 14230 stored in the main memory unit 140.

FIG. 23 is a PAD diagram illustrating pieces of processing carried out by execution of the referencer cataloging routine 14230 called by the inquiry code issuing program 1420*a* stored in the main memory unit 140 of the second embodiment. The referencer cataloging routine 14230 inputs the registrant ID 6201 and the referencer ID 6203 stored in the work area 1440 as well as the generated inquiry code and catalogs them in the referencer specification control table 1550 illustrated in FIG. 21 as a record associating a pair including the input registrant ID 6201 and the generated inquiry code with the input referencer ID 6203.

At a step 50701 of the referencer cataloging routine 14230 illustrated in FIG. 23, the referencer cataloging routine 14230 adds a record associating a pair including the input registrant ID 6201 and the generated inquiry code with the input referencer ID 6203 to the referencer specification control table 1550.

In the processing to issue an inquiry code carried out by execution of the referencer cataloging routine 14230 called by the inquiry code issuing program 1420*a* illustrated in FIG. 22 as described above, the referencer ID of a personal information referencer 72 specified by the personal information registrant 71 is cataloged in the referencer specification control table 1550 along with the registrant ID and the generated inquiry code.

Next, the processing carried out to display personal information of the second embodiment is explained. In the second embodiment, in the processing carried out to display personal information, the personal information referencer 72 is requested to enter the referencer ID and the referencer password assigned to the personal information referencer 72, a registrant ID and an inquiry code. The referencer ID and the referencer password are compared with records cataloged in the referencer control table 1540 illustrated in FIG. 20 in order to verify the validity of the personal information referencer 72. Then, the combination of the referencer ID, the registrant ID and the inquiry code is compared with records cataloged in the referencer specification control table 1550 illustrated in FIG. 21 in order to authenticate the combination. The personal information associated with the input registrant ID is displayed only if the personal information referencer 72 and the combination are found valid.

Figure 24B:
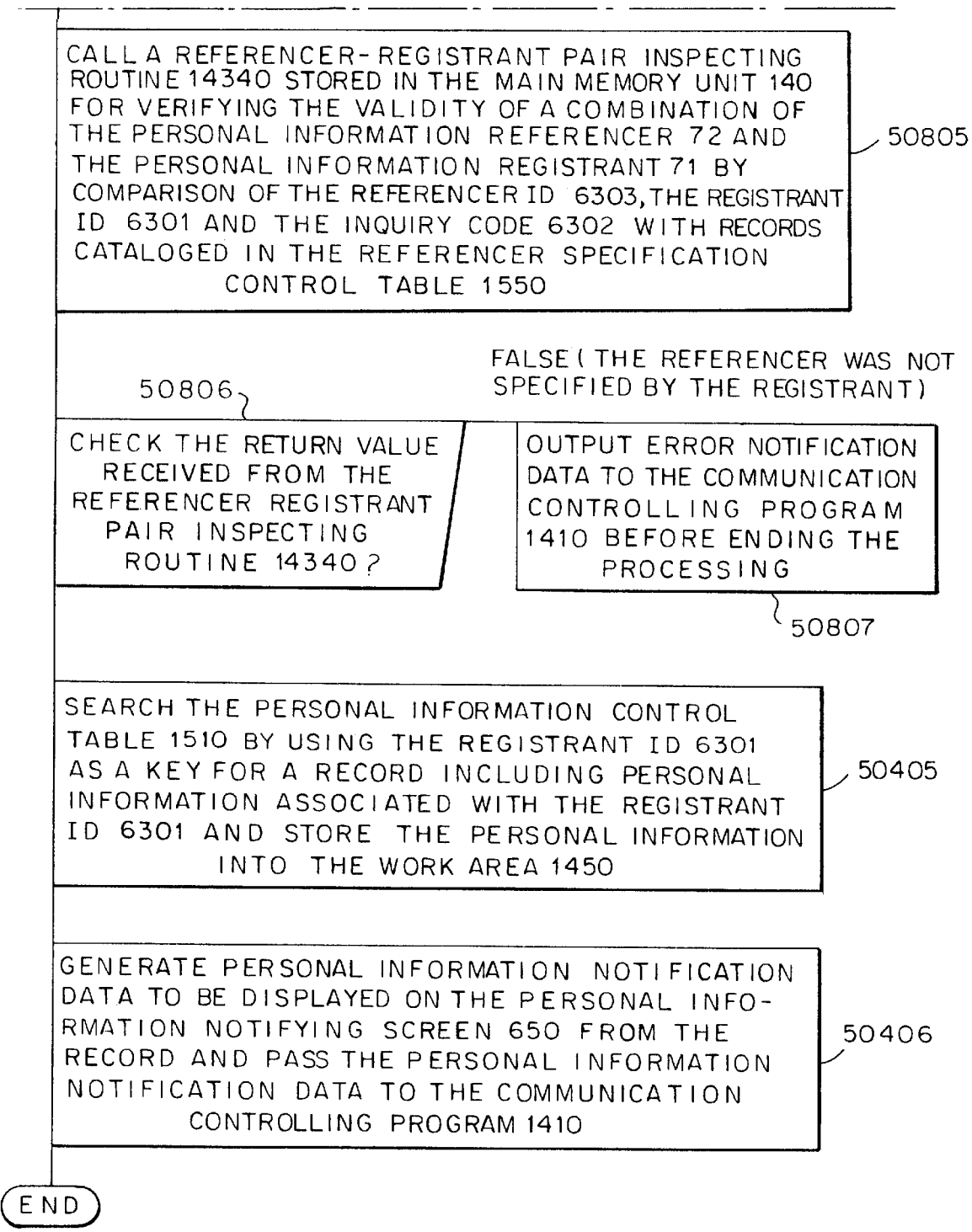
FIG. 24 is a PAD diagram illustrating pieces of processing carried out by execution of a personal information output program 1430a stored in the main memory unit 140.

FIG. 24 is a PAD diagram illustrating pieces of processing carried out by execution of the personal information output program 1430*a* stored in the main memory unit 140 of the second embodiment. In the personal information output program 1430*a*, the validity of a personal information referencer 72 and the combination of a referencer ID, a registrant ID and an inquiry code are verified by adding the following steps to the personal information output program 1430 of the first embodiment illustrated in FIG. 16.

At a step 50801, the personal information output program 1430*a* stores a referencer ID 6303 and a referencer password 6304 entered by the personal information referencer 72 in the work area 1450.

At a step 50802, the personal information output program 1430*a* calls a personal information referencer authenticating routine 14330 illustrated in FIG. 25 for verifying the validity of the personal information referencer 72 by comparison of the referencer ID 6303 and the referencer password 6304 with records cataloged in the referencer control table 1540 illustrated in FIG. 20. The reference authenticating routine 14330 also stored in the main memory unit 140 passes a logic value illustrating a result of the authentication to the calling personal information output program 1430*a* as a return value.

At a step 50803, the personal information output program 1430*a* checks the return value received from the personal information referencer authenticating routine 14330. If the return value is FALSE, that is, if either the referencer ID 6303 or the referencer password 6304 is not correct, at the step 50804, the personal information output program 1430*a* outputs error notification data to be displayed on an error notifying screen not illustrated in the figures to the communication controlling program 1410 before ending the processing.

At a step 50805, the personal information output program 1430*a* calls a referencer—registrant pair inspecting routine 14340 illustrated in FIG. 26 for verifying the validity of combination of the personal information referencer 72 and the personal information registrant 71 by comparison of the referencer ID 6303, the registrant ID 6301 and the inquiry code 6302 with records cataloged in the referencer specification control table 1550 illustrated in FIG. 21. The reference—registrant pair inspecting routine 14340 also stored in the main memory unit 140 passes a logic value illustrating a result of the inspection to the calling personal information output program 1430*a* as a return value.

At a step 50806, the personal information output program 1430*a* checks the return value received from the referencer-registrant pair inspecting routine 14340. If the return value is FALSE, that is, if either the referencer ID 6303, the registrant ID 6301 or the inquiry code is not correct, at the step 50807, the personal information output program 1430*a* outputs error notification data to be displayed on an error notifying screen not illustrated in the figures to the communication controlling program 1410 before ending the processing.

By adding the steps described above, the personal information output program 1430*a* displays personal information associated with a registrant ID 6301 only if a pair of a referencer ID 6303 and a referencer password 6304 and a combination of the referencer ID 6303, the registrant ID 6301 and an inquiry code 6302 are both found valid.

Next, the personal information referencer authenticating routine 14330 of FIG. 25 and the referencer—registrant pair inspecting routine 14340 of FIG. 26 called by the personal information output program 1430*a* illustrated in FIG. 24 are explained.

The description begins with an explanation of the personal information referencer authenticating routine 14330. The personal information referencer authenticating routine 14330 authenticates a personal information referencer 72 by searching the referencer control table 1540 illustrated in FIG. 20 by using a referencer ID 6303 read out from the work area 1450 as a key for a record and then comparing the contents of the registrant password field 1542 of the record with a referencer password 6304 read out from the work area 1450. If the personal information referencer 72 is found valid as will be described below, the personal information referencer authenticating routine 14330 returns a TRUE logic value to the calling personal information output program 1430a. If the personal information referencer 72 is found invalid as will be described below, on the other hand, the personal information referencer authenticating routine 14330 returns a FALSE logic value to the calling personal information output program 1430a. Steps of processing carried out by the personal information referencer authenticating routine 14330 are explained by referring to a PAD diagram illustrated in FIG. 25.

First of all, at a step 50901 of the PAD diagram illustrated in FIG. 25, the personal information referencer authenticating routine 14330 searches the referencer control table 1540 illustrated in FIG. 20 by using a referencer ID 6303 read out from the work area 1450 as a key for a record.

At a step 50902, the personal information referencer authenticating routine 14330 forms a judgment as to whether or not a record is found in the search carried out at the step 50901 and the contents of the referencer password field 1542 of the record match a referencer password 6304 read out from the work area 1450. At a step 50903, the personal information referencer authenticating routine 14330 returns a TRUE logic value to the calling personal information output program 1430a if a record is found in the search carried out at the step 50901 and the contents of the referencer password field 1542 of the record match a referencer password 6304 read out from the work area 1450. If a record is not found in the search carried out at the step 50901 from the beginning, that is, if the registrant ID 6301 entered by the personal information referencer 72 and stored in the work area 1450 is not valid, or if a record is found but the contents of the referencer password field 1542 of the record do not match the registrant referencer 6304 read out from the work area 1450, that is, if the pair including the registrant ID 6301 and the referencer password 6304 entered by the personal information referencer 72 and stored in the work area 1450 is not valid, on the other hand, the personal information referencer authenticating routine 14330 returns a FALSE logic value to the calling personal information output program 1430a at a step 50904.

The description is followed by an explanation of the referencer registrant pair inspecting routine 14340 illustrated in FIG. 26. The referencer—registrant pair inspecting routine 14340 authenticates a combination of a personal information referencer 72 and a personal information registrant 71 by searching the referencer specification control table 1550 illustrated in FIG. 21 by using a pair of a referencer ID 6301 and an inquiry code 6302 read out from the work area 1450 as a key for a record and then comparing the contents of the referencer ID field 1553 of the record with a referencer ID 6303 read out from the work area 1450. If the combination of the personal information referencer 72 and the personal information registrant 71 is found valid as will be described below, the referencer—registrant pair inspecting routine 14340 returns a TRUE logic value to the calling personal information output program 1430a. If the combination of the personal information referencer 72 and the personal information registrant 71 is found invalid as will be described below, on the other hand, the referencer—registrant pair inspecting routine 14340 returns a FALSE logic value to the calling personal information output program 1430a. Steps of processing carried out by the referencer registrant pair inspecting routine 14340 stored in the main memory unit 140 are explained by referring to a PAD diagram illustrated in FIG. 26.

First of all, at a step 51001 of the PAD diagram illustrated in FIG. 26, the referencer registrant pair inspecting routine 14340 searches the referencer specification control table 1550 illustrated in FIG. 21 by using a pair of a registrant ID 6301 and an inquiry code 6302 read out from the work area 1450 as a key for a record.

At a step 51002, the referencer—registrant pair inspecting routine 14340 forms a judgment as to whether or not a record is found in the search carried out at the step 51001 and the contents of the referencer ID field 1553 of the record match a referencer ID 6303 read out from the work area 1450. At a step 51003, the referencer registrant pair inspecting routine 14340 returns a TRUE logic value to the calling personal information output program 1430a if a record is found in the search carried out at the step 51001 and the contents of the referencer ID field 1553 of the record match a referencer ID 6303 read out from the work area 1450. If a record is not found in the search carried out at the step 51001 from the beginning, that is, if at least one of the registrant ID 6301 and the inquiry code entered by the personal information referencer 72 and stored in the work area 1450 is not valid, or if a record is found but the contents of the referencer ID field 1553 of the record do not match the referencer ID 6303 read out from the work area 1450, that is, if the combination of the registrant ID 6301, the inquiry code 6302 and the referencer ID 6303 entered by the personal information referencer 72 and stored in the work area 1450 is not valid, on the other hand, the referencer—registrant pair inspecting routine 14340 returns a FALSE logic value to the calling personal information output program 1430a at a step 51004.

Operations of the second embodiment having the configuration described above are explained below by focusing on differences from the first embodiment. In the case of the second embodiment, the inquiry code issuance application screen 620a illustrated in FIG. 18 has an input line to be used by the personal information registrant 71 for entering a referencer ID 6203 specifying a desired personal information referencer 72 who is expected to refer to personal information of the personal information registrant 71 in addition to the input lines for entering a registrant ID 6201 and a registrant password 6203 as described above. During the processing carried out to issue an inquiry code, the referencer cataloging routine 14230 catalogs the generated inquiry code along with the input registrant ID 6201 and the input referencer ID 6203 in the referencer specification control table 1550 illustrated in FIG. 21 as a record associating the pair including the input registrant ID 6201 and the generated inquiry code with the input referencer ID 6203. In the processing carried out to display personal information, on the other hand, the personal information referencer 72 enters a referencer ID 6303 and a referencer password 6304 to their respective input lines on the personal information display application screen 630a illustrated in FIG. 19 in addition to a registrant ID 6301 and an inquiry code 6302. First of all, the personal information output program 1430a calls the personal information referencer authenticating routine 14330 for verifying the validity of the personal information referencer 72 by comparison of the referencer ID 6303 and the referencer password 6304 with records cataloged in the referencer control table 1540 illustrated in FIG. 20. Then, the personal information output program 1430a calls the referencer—registrant pair inspecting routine 14340 for verifying the validity of a combination of the personal information referencer 72 and the personal information registrant 71 by comparison of the referencer ID 6303, the registrant ID 6301 and the inquiry code with records cataloged in the referencer specification control table 1550 illustrated in FIG. 21. The desired personal information is displayed only if the personal information referencer authenticating routine 14330 verifies the validity of the personal information referencer 72 and the referencer—registrant pair inspecting routine 14340 verifies the validity of the combination of the personal information referencer 72 and the personal information registrant 71. That is to say, the personal information output program 1430a displays the desired personal information only if requested by a personal information referencer 72 who has been specified by a referencer ID 6203 entered by a personal information registrant 71 during the processing carried out to issue an inquiry code. For this reason, there will be no problem even if a third party happens to know the inquiry code by any chance.

As described above, according to the second embodiment, it is no longer necessary to exercise care so as to avoid an issued inquiry code from being known by a third party other than a personal information referencer 72 other than that intended by the personal information registrant 71.

Third Embodiment

In the case of the first or second embodiment, since the personal information output program 1430 illustrated in FIG. 16 or 1430a illustrated in FIG. 24 deletes an inquiry code from the inquiry code control table 1520 after personal information associated with the inquiry code has been displayed, the inquiry code can be used only once. For this reason, if the recorded contents of personal information change after the personal information has been displayed, it is necessary for the personal information registrant 71 to request the personal information controlling apparatus 10 to issue an inquiry code once more in case the personal information referencer 72 wants to reference the personal information again. In order to solve this problem, the present invention provides a third embodiment wherein the term of validity of an issued inquiry code can be set to allow the personal information associated with the issued inquiry code to be displayed as many times as desired so long as the request to display the personal information is made within the term of validity.

The third embodiment is explained in detail by referring to FIGS. 27–30 as follows. The third embodiment has a configuration based on that of the first embodiment. However, the third embodiment can also be configured the same as the second.

FIG. 27 is a diagram illustrating a validity term control table 1560 added to the secondary storage unit 150 of the third embodiment. The validity term control table 1560 is used for controlling terms of validity of issued inquiry codes. As illustrated in the FIG. 27, each record in the validity term control table 1560 includes a registrant ID field 1561, an inquiry code field 1562 and a validity term expiration date field 1563. An expiration date of a term of validity of an issued inquiry code is cataloged in the validity term control table 1560 during the processing carried out to issue the inquiry code. During the processing carried out to display personal information associated with the inquiry code, on the other hand, the term of validity of the inquiry code is referenced to find out whether or not the request to display the personal information is made within the term of validity.

FIG. 28 is a PAD diagram illustrating pieces of processing carried out by execution of the inquiry code issuing program 1420b stored in the main memory unit 140 of the third embodiment, a counterpart of the inquiry code issuing program 1420 of the first embodiment illustrated in FIG. 13. The inquiry code issuing program 1420b is similar to the inquiry code issuing program 1420 of the first embodiment except that the former also catalogs the term of validity of an issued inquiry code by carrying out pieces of processing at the following steps which are added to the latter.

At a step 51101, the inquiry code issuing program 1420b calls a validity term cataloging routine 14240 of FIG. 29 for cataloging the term of validity of an issued inquiry code.

FIG. 29 is a PAD diagram illustrating pieces of processing carried out by execution of the validity term cataloging routine 14240 called by the inquiry code issuing program 1420b illustrated in FIG. 28. The validity term cataloging routine 14240 also stored in the main memory unit 140 catalogs the term of validity of an issued inquiry code in the validity term control table 1560 illustrated in FIG. 27 by carrying out pieces of processing at a step 15201 as follows.

At a step 51201, a set including an input registrant ID 6201 entered by the personal information registrant 71, an inquiry code issued for the registrant ID 6201 and a predetermined term of validity of the inquiry code is cataloged as a record in the validity term control table 1560.

FIG. 30 is a PAD diagram illustrating pieces of processing carried out by execution of an inquiry code authenticating program 14310a stored in the main memory unit 140 of the third embodiment, a counterpart of the inquiry code authenticating program 14310 of the first embodiment illustrated in FIG. 16. As illustrated in the figure, the inquiry code authenticating program 14310a also carries out processing to form a judgment as to whether or not the term of validity of an inquiry code has expired at the following steps added to the inquiry code authenticating program 14310.

At a step 52401, the inquiry code authenticating program 14310a searches the validity term control table 1560 by using a pair of an input registrant ID 6301 and an issued inquiry code 6302 for a record.

At a step 52402, the inquiry code authenticating program 14310a forms a judgment as to whether or not the contents of the validity term field 1563 of the record found in the search carried out at the step 52401 is a time preceding the present time, that is, whether or not the term of validity of the issued inquiry code has expired. If the outcome of the judgment is YES, steps 52403 and 52404 are executed.

At a step 52403, the inquiry code authenticating program 14310a deletes the record found in the search carried out at the step 52401 from the validity term control table 1560.

At a step 52404, the inquiry code authenticating program 14310a returns a FALSE logic value to the calling program.

The judgment formed at the step 52402 allows the record found in the search carried out at the step 50501 to be deleted from the inquiry code control table 1520 at the step 50504 only after the term of validity of the issued inquiry code has expired.

According to the configuration of the third embodiment described above, the term of validity of an issued inquiry code can be set to allow personal information associated with an issued inquiry code to be displayed as many times as desired so long as the request to display the personal information is made within the term of validity.

Fourth Embodiment

In the first to third embodiments, as a technique to check whether or not an input inquiry code entered by a personal information referencer 72 is indeed an inquiry code issued in the official processing carried out previously to issue the inquiry code, the input inquiry code entered by the personal information referencer 72 in the processing carried out to display personal information indicated by the inquiry code is compared with the issued inquiry code cataloged in the inquiry code control table 1520 illustrated in FIG. 5 in the processing carried out to issue the inquiry code. As a result, there is raised a problem that the length of the inquiry code control table 1520 increases proportionally to the number of times the processing to issue an inquiry code is carried out due to the fact that each time an inquiry code is issued, it is necessary to add a record including the issued inquiry code to the inquiry code control table 1520.

In order to solve the problem described above, in the case of the fourth embodiment, the necessity to catalog information on each individual inquiry code issued in the processing carried out to issue the inquiry code is eliminated. In the fourth embodiment, an inquiry code generating method based on an encryption technology is adopted so that the validity of an inquiry code entered by a personal information referencer 72 can be verified without storing the issued inquiry code in an inquiry code control table 1520.

First of all, the principle underlying the fourth embodiment is explained.

In the processing carried out by the fourth embodiment to issue an inquiry code, an inquiry code is generated as a function of registrant and referencer IDs entered by a personal information registrant 71. The expression of the inquiry code generating function is not disclosed to the user. Otherwise, the user would be capable of deriving an inquiry code from registrant and referencer IDs by using the disclosed inquiry code generating function by itself without the need to resort to the official processing provided for issuing an inquiry code.

In the processing carried out to display personal information, on the other hand, the personal information referencer 72 enters registrant and referencer IDs as well as an inquiry code. An inquiry code is again calculated from the entered registrant and referencer IDs to be compared with the entered inquiry code. A calculated inquiry code matching the entered inquiry code indicates that the entered inquiry code can be judged to be the inquiry code issued in the official processing carried out to issue an inquiry code provided the entered registrant and referencer IDs are correct.

In any of the first to fourth embodiments, a personal information referencer 72 is not capable of acquiring personal information of a personal information registrant 71 without permission given by the registrant 71 even if the referencer 72 knows the registrant ID assigned to the registrant 71. This is because, in addition to the registrant ID and a referencer ID assigned to the referencer 72, the personal information referencer 72 has to enter an inquiry code unique to the registrant ID and a referencer ID. However, the inquiry code can only be issued by the inquiry code issuing processing carried out as an official inquiry code issuing method which can not be executed by the personal information referencer 72 unless the referencer 72 also knows a registrant password assigned to the personal information registrant 71. Since the personal information referencer 72 does not know the registrant password in general, the referencer 72 is not capable of executing the processing to issue an inquiry code. In the case of the fourth embodiment, the personal information referencer 72 would be capable of deriving an inquiry code from registrant and referencer IDs by using an inquiry code generating function by itself without the need to resort to the official processing provided carried out to issue an inquiry code if the referencer 72 knew the function. Since the inquiry code generating function is not disclosed to the user, however, the personal information referencer 72 by no means knows the function and is, thus, incapable of deriving an inquiry code from registrant and referencer IDs for which the unknown function is required. An inquiry code is issued by the official processing carried out to issue the inquiry code only at a request made by a personal information registrant 71, the owner of personal information who then notifies a personal information referencer 72 of the issued inquiry code.

The principle described above is explained in more detail by referring to FIGS. 31–38 as follows.

Figure 31:
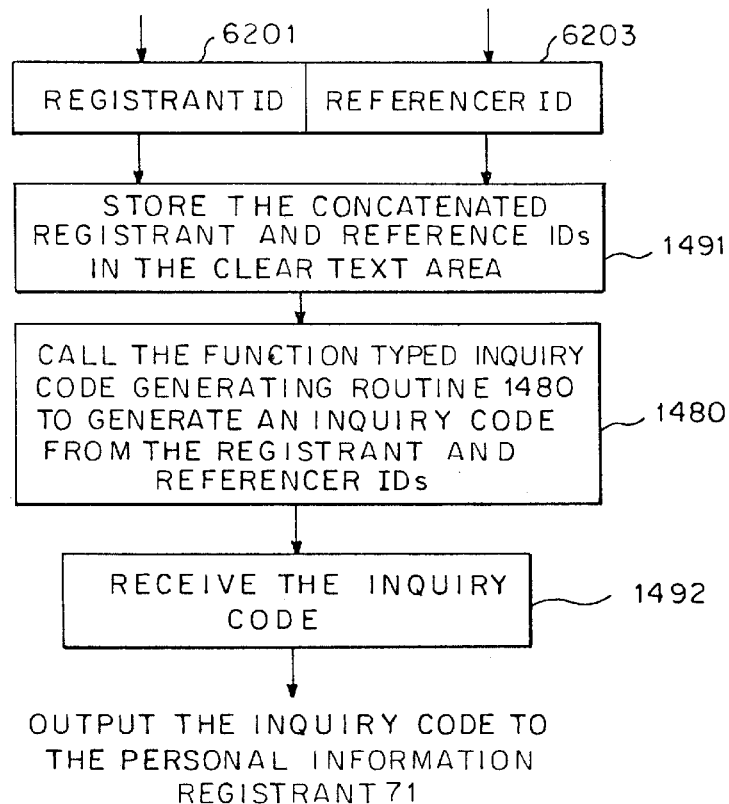
FIG. 31 is a diagram illustrating the principle embraced in processing carried out by a fourth embodiment to generate an inquiry code.

First of all, refer to FIG. 31, a diagram illustrating the principle embraced in processing carried out by the fourth embodiment to generate an inquiry code. As illustrated in the figure, in the processing carried out by present embodiment to generate an inquiry code, a registrant ID 6201 and a referencer ID 6203 entered by a personal information registrant 71 are concatenated with each other and stored in a clear text area 1491 provided in the secondary memory unit 140. Then, a function typed inquiry code generating routine 1480 illustrated in FIG. 38 is activated. The function typed inquiry code generating routine 1480 is a routine based on an inquiry code generating function. The function typed inquiry code generating routine 1480 generates an inquiry code 1492 as a function of data stored in the clear text area 1491. The inquiry code 1492 generated in this way is then output to the personal information registrant 71 who then notifies a personal information referencer 72 of the issued inquiry code.

Figure 32:
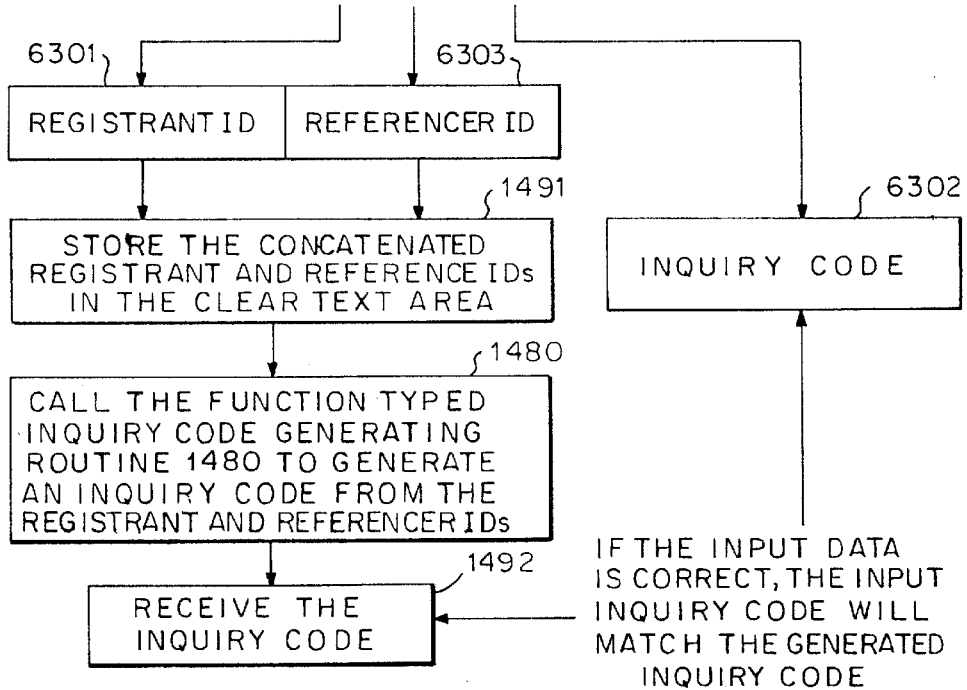
FIG. 32 is a diagram illustrating the principle embraced in processing carried out by the fourth embodiment to authenticate an inquiry code.

Next, referring to FIG. 32, a diagram illustrating the principle embraced in processing carried out by the fourth embodiment to authenticate an inquiry code is shown. As illustrated FIG. 32, in the processing carried out by present embodiment to authenticate an inquiry code, a registrant ID 6301 and a referencer ID 6303 entered by a personal information referencer 72 are concatenated with each other and stored in the clear text area 1491. Then, the function typed inquiry code generating routine 1480 is activated. The function typed inquiry code generating routine 1480 generates an inquiry code 1492 as a function of data stored in the clear text area 1491. The inquiry code 1492 generated in this way is then compared with an inquiry code 6302 entered by the personal information referencer 72. An inquiry code 6302 matching the calculated inquiry code 1492 is judged to be a valid inquiry code.

The configuration of the present embodiment is described as follows.

The configuration of the present embodiment is based on that of the second embodiment of the present embodiment but, as will be described later, the structure of control tables stored in the secondary storage unit 150 and pieces of processing carried out by some programs in the former are different from those of the latter. Differences between the fourth and second embodiments are explained as follows.

The screens displayed on the terminal 20 and operational methods adopted by the user in the present embodiment are the same as the second embodiment. That is to say, a personal information registrant 71 makes a request for processing to be carried out to issue an inquiry code with a personal information referencer 72 specified as a recipient of the inquiry code. In making the request, the personal information registrant 71 also enters a registrant ID and a registrant password assigned to itself in addition to the specified personal information referencer 72. In response to the request, an inquiry code is issued to the personal information registrant 71 who then notifies a personal information referencer 72 of the issued inquiry code.

Figure 33:
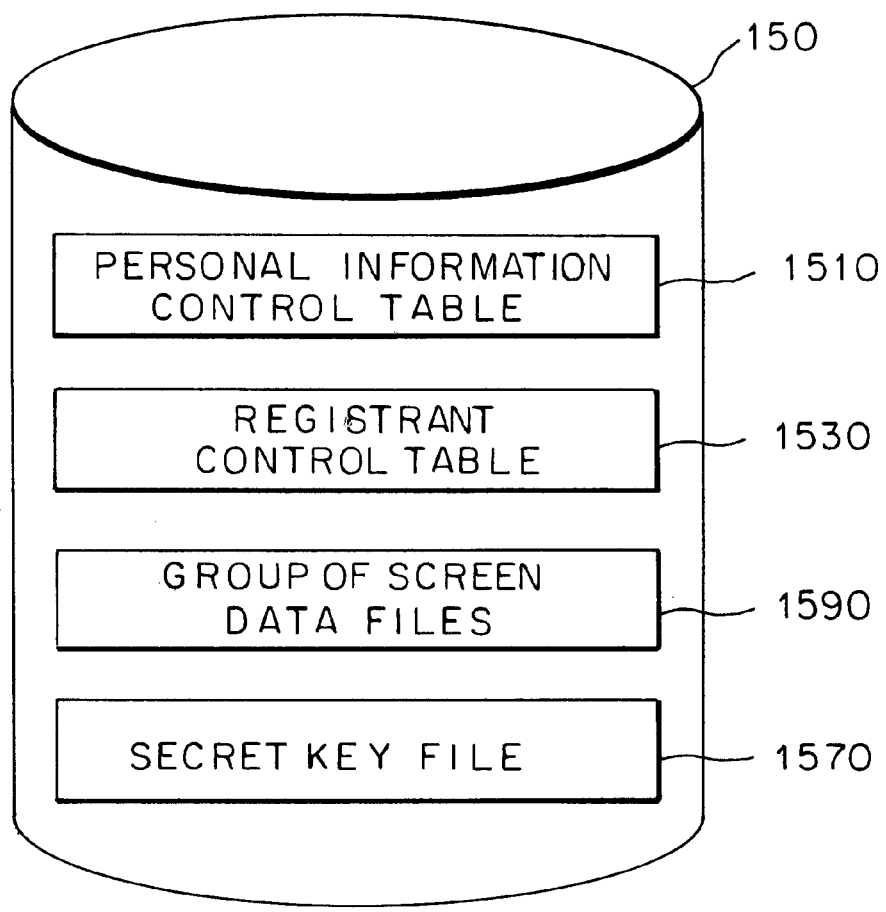
FIG. 33 is a diagram illustrating the configuration of a secondary storage unit 150 employed in the personal information controlling apparatus 10 of a fourth embodiment.

FIG. 33 is a diagram illustrating the structure of information stored in the secondary storage unit 150 of the present embodiment. As illustrated in FIG. 33, the structure of the information stored in the secondary storage unit 150 includes a newly provided secret key file 1570 for the present embodiment in addition to the personal information control table 1510, the registrant control table 1530 and a screen data file group 1590 which are also included in the second embodiment. The secret key file 1570 is used for storing a secret key, that is, data used by the function typed inquiry code generating routine 1480 as a parameter of the inquiry code generating function.

Figure 34:
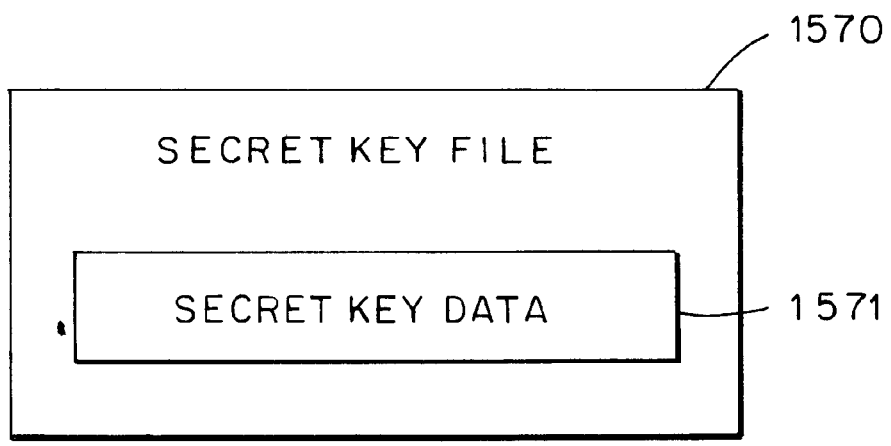
FIG. 34 is a diagram illustrating the structure of information stored in the secret key file 1570.

FIG. 34 is a diagram illustrating the structure of information stored in the secret key file 1570. As illustrated in FIG. 34, the secret key file 1570 is used for storing secret key data 1571 used by the function typed inquiry code generating routine 1480 as a parameter of the inquiry code generating function. The secret key data is a value which was generated by a random number prior to the operation of the personal information controlling apparatus 10. The actual value of the secret key data is not disclosed to the user.

FIG. 35 is a PAD diagram illustrating pieces of processing carried out by execution of an inquiry code issuing program 1420c stored in the main memory unit 140 of the present embodiment, a program used in place of the inquiry code issuing program 1420a of the second embodiment illustrated in FIG. 22. The inquiry code issuing program 1420c has the following steps.

At a step 51501, the inquiry code issuing program 1420c stores a registrant ID 6201, a registrant password 6202 and a referencer ID 6203 entered by the personal information registrant 71 in the work area 1440.

At a step 51502, the inquiry code issuing program 1420c calls the personal information registrant authenticating routine 14210 illustrated in FIG. 14 for checking the validity of the pair including the registrant ID 6201 and the registrant password 6202. The personal information registrant authenticating routine 14210 passes a logic value indicating whether or not the pair including the registrant ID 6201 and the registrant password 6202 is valid to the calling inquiry code issuing program 1420c as a return value.

At a step 51503, the inquiry code issuing program 1420c checks the logic value returned by the personal information registrant authenticating routine 14210. If the logic value is TRUE, that is, if the pair including the registrant ID 6201 and the registrant password 6202 is found valid, the inquiry code issuing program 1420c executes steps 51504 to 51506. If the logic value is FALSE, that is, if the pair including the registrant ID 6201 and the registrant password 6202 is found invalid, of the other hand, the inquiry code issuing program 1420c executes a step 51507.

At the step 51504, the inquiry code issuing program 1420c concatenates the registrant ID 6201 with the referencer ID 6203 and stores the result of the concatenation in the clear text area 1491.

At the step 51505, the inquiry code issuing program 1420c calls a function typed inquiry code generating routine 1480 illustrated in FIG. 37 for generating an inquiry code corresponding to the registrant ID 6201 and the referencer ID 6203. The function typed inquiry code generating routine 1480 generates an inquiry code and passes the inquiry code to the calling inquiry code issuing program 1420c as a return value.

At the step 51506, the inquiry code issuing program 1420c generates inquiry code notification data to be displayed on the inquiry code notifying screen 640 illustrated in FIG. 11 from the inquiry code returned by the function type inquiry code generating routine 1480 and passes the inquiry code notification data to the communication controlling program 1410.

At the step 51507, the inquiry code issuing program 1420c outputs error notification data not illustrated in the figures to the communication controlling program 1410 to report the fact that the requested processing to be carried out to issue an inquiry code is rejected due to an invalid pair including the registrant ID 6201 and the registrant password 6202 before ending the processing.

An inquiry code is issued in the processing described above only if the pair of the input registrant ID and the input registrant password is found valid. In the present embodiment, the inquiry code is calculated as a function of registrant ID and referencer ID entered by the personal information registrant 71.

FIG. 36 is a PAD diagram illustrating pieces of processing carried out by execution of a personal information output program 1430b stored in the main memory unit 140 of the present embodiment, a program used in place of the personal output program 1430 of the second embodiment illustrated in FIG. 16. The personal information output program 1430b has the following steps.

First of all, at a step 51601 of the PAD diagram illustrated in FIG. 36, the personal information output program 1430b stores a registrant ID 6301, an inquiry code 6302, a referencer ID 6303 and a referencer password 6304 entered by the personal information referencer 72 in the work area 1450.

At a step 51602, the personal information output program 1430b calls the personal information referencer authenticating routine 14330 illustrated in FIG. 25 for verifying the validity of the personal information referencer 72 by comparison of the referencer ID 6303 and the referencer password 6304 with records cataloged in the referencer control table 1540 illustrated in FIG. 20. The reference authenticating routine 14330 passes a logic value illustrating a result of the authentication to the calling personal information output program 1430b as a return value.

At a step 51603, the personal information output program 1430b checks the return value received from the personal information referencer authenticating routine 14330. If the return value is FALSE, that is, if either the referencer ID 6303 or the referencer password 6304 is not correct, the personal information output program 1430b outputs error notification data to be displayed on an error notifying screen not illustrated in the figures to the communication controlling program 1410 before ending the processing at a step 51604.

At a step 51605, the personal information output program 1430b concatenates the registrant ID 6301 with the referencer ID 6303 and stores a result of the concatenation in the clear text area 1491.

At a step 51606, the personal information output program 1430b calls a function typed inquiry code authenticating routine 14350 illustrated in FIG. 38 for checking the validity of the pair including the registrant ID 6301 and the inquiry code 6302. The function typed inquiry code authenticating routine 14350 passes a logic value indicating whether or not the pair including the registrant ID 6301 and the inquiry code 6302 is valid to the calling personal information output program 1430b as a return value.

At a step 51607, the personal information output program 1430b checks the logic value returned by the function typed inquiry code authenticating routine 14350. If the logic value is TRUE, that is, if the pair including the registrant ID 6301 and the inquiry code 6302 is found valid, the personal information output program 1430b executes steps 51609 and 51610 described below. If the logic value is FALSE, that is, if the pair including the registrant ID 6301 and the inquiry code 6302 is found invalid, of the other hand, the personal information output program 1430b executes a step 51608. At the step 51608, the personal information output program 1430b outputs error notification data not illustrated in the figures to the communication controlling program 1410 to report the fact that the requested processing to be carried out to display personal information is rejected due to an invalid pair including the registrant ID 6301 and the inquiry code 6302 before ending the processing.

At the step 51609, the personal information output program 1430b searches the personal information control table 1510 illustrated in FIG. 4 by using the registrant ID 6301 as a key for a record including personal information associated with the registrant ID 6301. The personal information found in the search is read out from the personal information control table 1510 and stored into the work area 1450.

At the step 51610, the personal information output program 1430b generates personal information notification data to be displayed on the personal information notifying screen 650 illustrated in FIG. 12 from the personal information read out from the work area 1450 and passes the personal information notification data to the communication controlling program 1410.

In the processing described above, personal information associated with a registrant ID entered by a personal information referencer 72 is displayed only if a pair of a referencer ID and a referencer password entered by the personal information referencer 72 is found valid and a combination of the entered registrant ID, an entered referencer ID and an inquiry code entered by the personal information referencer 72 is also found valid as well. That is, the processing carried out to display personal information can be requested only by the personal information referencer 72 itself who knows the referencer password assigned thereto. In addition, the personal information referencer 72 has to be specified by a personal information registrant 71 by using a referencer ID assigned to the personal information referencer 72 during the processing carried out to issue the inquiry code.

FIG. 37 is a PAD diagram illustrating pieces of processing carried out by of the present embodiment by execution of the function typed inquiry code generating routine 1480 also stored in the main memory unit 140. The function typed inquiry code generating routine 1480 is executed to find an inquiry code as a function of registrant and referencer IDs stored in the clear text area 1491.

As an example of a function expression for deriving an inquiry code, an expression of a message digest function proposed as a kind of encryption algorithm is adopted in the present embodiment. As described on page 218 of the aforementioned document authored by Simson Garfinkel, the message digest function outputs a short digested data with a fixed length from input data with typically a large size and a variable length. The message digest function provides a function that a slight difference between pieces of input data appears as a large change in output data. Thus, the message digest function is used in detection of falsification of data transmitted by use of a transmission line wherein a heightened fear exists that the data is prone to falsification. As actual expressions of the message digest function, expressions of a variety functions for different digest data lengths and different amounts of computation have been proposed. In the present embodiment, any function expression can be adopted as long as the output digest data has such a length that the user is capable to write down a copy of the data with the hand without any inconvenience.

In the case of the present embodiment, the message digest function is applied after secret key data 1571 not disclosed to the user is added to the clear text area 1491. The function expression adopted in this routine is also not disclosed to the user either. Thus, even if a third party happens to know the substance of the processing carried out by the function typed inquiry code generating routine 1480, the third party is not capable of deriving an inquiry code since the actual value of the secret key data 1571 is not known.

Steps of processing carried out by the function typed inquiry code generating routine 1480 is explained by referring to a PAD diagram illustrated in FIG. 37.

At a step 51701, the function typed inquiry code generating routine 1480 adds secret key data 1571 to the clear text area 1491.

At a step 51702, the function typed inquiry code generating routine 1480 generates an inquiry code by computation of message digest data of a registrant ID and a referencer ID stored in the clear text area 1491 by using the secret key data 1571.

At a step 51703, the function typed inquiry code generating routine 1480 returns the inquiry code to the calling program, that is, either the inquiry code issuing program 1420c illustrated in FIG. 35 or the function typed inquiry code authenticating routine 14350 of FIG. 38 which is called by the personal information output program 1430b illustrated in FIG. 36.

In the above processing, an inquiry code is generated as a function of registrant and referencer IDs stored in the clear text area 1491.

FIG. 38 is a PAD diagram illustrating pieces of processing carried out by of the present embodiment by execution of the function typed inquiry code authenticating routine 14350 stored in the main memory unit 140. Called by the personal information output program 1430b illustrated in FIG. 36, the function typed inquiry code authenticating routine 14350 computes an inquiry code from data entered by a personal information referencer 71 and stored in the clear text area 1491 by the personal information output program 1430b and then compares the inquiry code resulting from computation with an inquiry code entered by the personal information referencer 72 in order to form a judgment as to whether or not the combination of the entered data and the entered inquiry code is valid.

At a step 51801, the function typed inquiry code authenticating routine 14350 computes an inquiry code from data entered by a personal information referencer 71 and stored in the clear text area 1491 by the personal information output program 1430b by calling the function typed inquiry code generating routine 1480 illustrated in FIG. 37.

At a step 51802, the function typed inquiry code authenticating routine 14350 compares the inquiry code returned by the function typed inquiry code generating routine 1480 with an inquiry code 6302 entered by the personal information referencer 72 in order to form a judgment as to whether or not the combination of the entered data and the entered inquiry code 6302 is valid. If the inquiry code returned by the function typed inquiry code generating routine 1480 matches the inquiry code 6302 entered by the personal information referencer 72, the function typed inquiry code authenticating routine 14350 returns a TRUE logic value to the calling personal information output program 1430b at a step 51803. If the inquiry code returned by the function typed inquiry code generating routine 1480 does not match the inquiry code 6302 entered by the personal information referencer 72, the function typed inquiry code authenticating routine 14350 returns a FALSE logic value to the calling personal information output program 1430*b* at a step 51804.

In the processing carried out to authenticate an inquiry code as described above, the function typed inquiry code authenticating routine 14350 returns a TRUE logic value to the calling personal information output program 1430*b* indicating a successful authentication only if a combination of registrant and referencer IDs and an inquiry code entered by a personal information referencer 72 is found valid.

As described above, according to the present embodiment, it is possible to eliminate the necessity to catalog a record in an inquiry code control table 1520 of FIG. 5 stored in the secondary storage unit 150 each time the processing to issue an inquiry code.

Fifth Embodiment

In the case of the fourth embodiment described above, since secret key data 1571 common to all combinations of registrant and referencer IDs is used in the processing carried out to issue an inquiry code, a personal information referencer 72 will be inevitably capable of computing an inquiry code by itself from a referencer ID assigned thereto and an arbitrary registrant ID of a personal information registrant 71 communicated thereto without resorting to the official processing carried out to issue an inquiry code if the personal information referencer 72 happens to know the substance of the processing carried out by the function typed inquiry code generating routine 1480 and the actual value of the common secret key data 1571 used in the function typed inquiry code generating routine 1480 by any chance. As a result, there is raised a problem that the personal information referencer 72 is capable of acquiring personal information of the personal information registrant 71 without the need to resort to the registrant 71 for execution of the processing to issue an inquiry code. In order to solve the problem described above, the present invention provides a fifth embodiment wherein a plurality of secret keys are provided and one of the secret keys is selected depending upon a registrant ID used in the generation of an inquiry code so that a secret key known by a personal information referencer 72 does not lead immediately to leakage of personal information of all personal information registrants 71 to the personal information referencer 72. While a piece of secret key data (that is, a secrete key) can be associated with each registrant ID, in the configuration described below, only a fixed number of secret keys are provided. A secret key ID is assigned to each piece of secret key data and a secret key ID is determined as a function of registrant ID. In this way, the number of secret keys can be reduced. As an example of a function for determining a secret key ID from a registrant ID, in the present embodiment, a function using only the three least significant digits of a registrant ID is adopted. It is needless to say that another function for determining a secret key ID from a registrant ID can also be used.

The configuration of the present embodiment is explained as follows. Even though the configuration of the present embodiment is based on that of the fourth one, there are the following differences between them.

FIG. 39 is a diagram illustrating the structure of a secret key control table 1580 stored in the secondary storage unit 150 of the present embodiment. As illustrated in FIG. 39, the secret key control table 1580 is a control table used for storing a plurality of secret keys each associated with a secret key ID. Each record in the secret key control table 1580 includes a secret key ID field 1581 and a secret key data field 1582.

Prior to the operation of the personal information controlling apparatus 10, the secret key control table 1580 is filled up with secret keys which are associated with 1,000 secret key IDs 000 to 999 and generated from random numbers.

FIG. 40 is a PAD diagram illustrating pieces of processing carried out by of the present embodiment by execution of a function typed inquiry code generating routine 1480*a* stored in the main memory unit 140 in place of the function typed inquiry code generating routine 1480 of the fourth embodiment illustrated in FIG. 37. The function typed inquiry code generating routine 1480*a* generates an inquiry code by using a piece of secret key data found by searching the secret key control table 1580 illustrated in FIG. 39 with a secret key ID used as a key. The pieces of processing carried out by the function typed inquiry code generating routine 1480*a* is explained by referring to FIG. 40 as follows.

At a step 52101, the function typed inquiry code generating routine 1480*a* picks up the three least significant digits of a registrant ID 6201 stored in the clear text area 1491 as a secret key ID.

At a step 52102, the function typed inquiry code generating routine 1480*a* searches the secret key control table 1580 illustrated in FIG. 39 for a piece of secret key data by using the secret key ID obtained at the step 52101 as a key.

At a step 52103, the function typed inquiry code generating routine 1480*a* adds a piece of secret key data stored in the secret key data field 1582 of a record found in the search carried out at the step 52103 to the clear text area 1491.

At a step 52104, the function typed inquiry code generating routine 1480*a* computes an inquiry code as message digest data of the clear text area 1491.

At a step 52105, the function typed inquiry code generating routine 1480*a* returns the inquiry code calculated at the step 52104 to the calling program, that is, that is, either the inquiry code issuing program 1420*c* illustrated in FIG. 35 or the function typed inquiry code authenticating routine 14350 of FIG. 38 which is called by the personal information output program 1430*b* illustrated in FIG. 36.

By carrying out the pieces of processing described above, it is possible to generate an inquiry code which varies from registrant ID to registrant ID.

Sixth Embodiment

In the case of the first to fifth embodiments, the personal information controlling system has a configuration wherein the terminals 20 are each implemented by a general computer connected to the personal information controlling apparatus 10 by a communication network 30. In such a configuration, it is thus necessary for the personal information registrant 71 and the personal information referencer 72 who want to take advantage of the present invention to own a computer connected to the communication network 30, giving rise to a problem that the cost to be borne by the user is high. The sixth embodiment employs a push phone or a facsimile which is widely used as a terminal 20 in order to solve the problem described above, that is, to reduce the cost to be borne by the user.

In the case of the present embodiment, sound generated by the push phone or a page output by the facsimile is used to replace an operation guide or an output result displayed to the user on a screen of the first to fifth embodiments. Further, an input entered by the user can be provided by voice from the user when the push phone is used.

FIG. 41 is a diagram illustrating the configuration of the personal information controlling system implemented by the present embodiment. As illustrated in FIG. 41, the personal information controlling apparatus 10*a* having a VDT is connected by a telephone network 30a to the push phone 20a and the facsimile 20b used by the personal information registrant 71 and the personal information referencer 72 respectively as a terminal 20.

Figure 42:
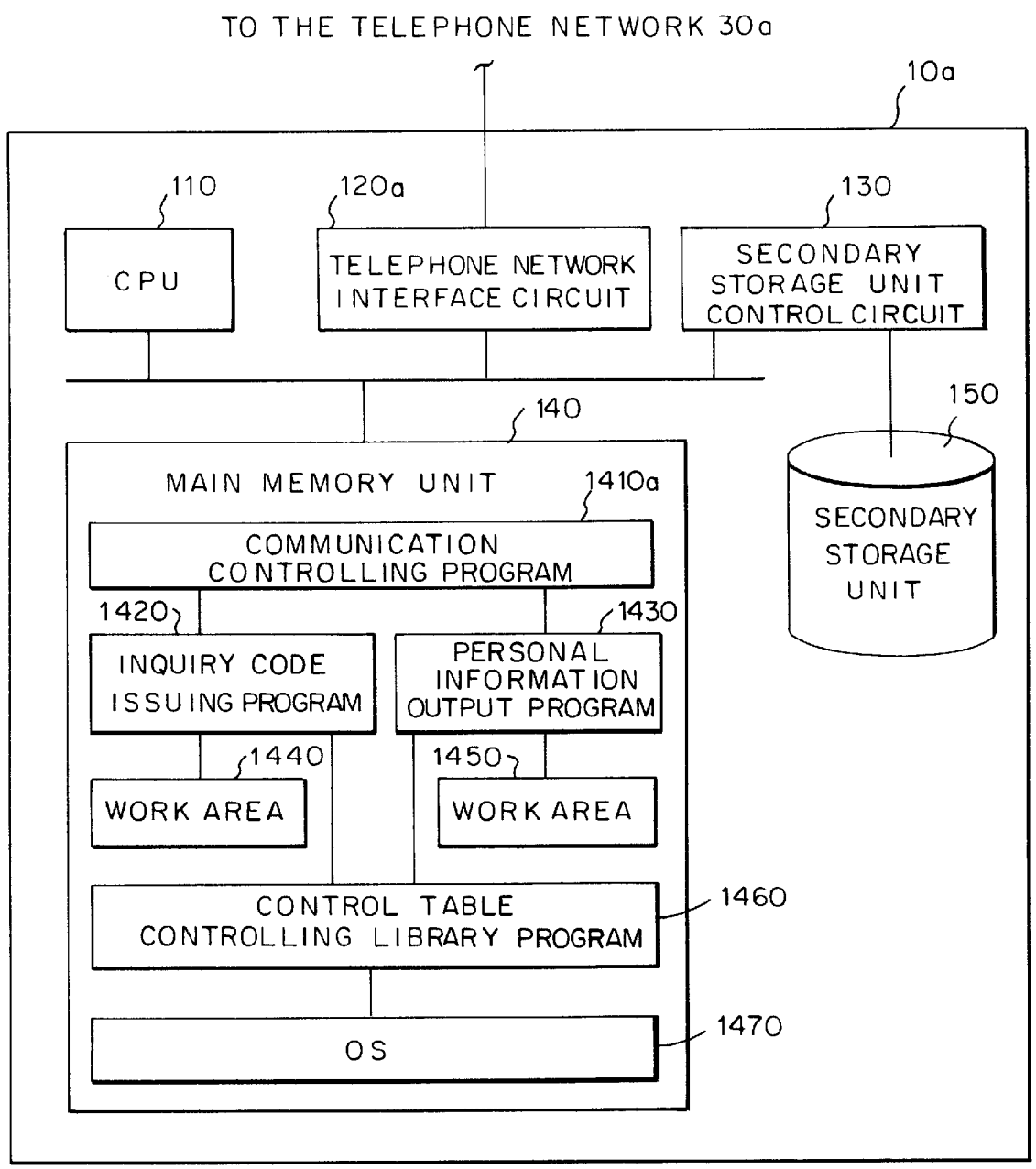
FIG. 42 is a diagram illustrating the configuration of a personal information controlling apparatus 10a implemented by the sixth embodiment.

FIG. 42 is a diagram illustrating the configuration of the personal information controlling apparatus 10a implemented by the present embodiment.

The personal information controlling apparatus 10a implemented by the present embodiment is based on the personal information controlling apparatus 10 of the first embodiment with the following components replaced.

A telephone line interface circuit 120a connected to the telephone network 30a is provided to replace the network interface circuit 120. The telephone line interface circuit 120a carries out processing to handle incoming calls, processing to receive sound generated by the push phone 20a and processing to transmit guidance sound and FAX data to the push phone 20a and the facsimile 20b respectively in accordance with instructions issued by the CPU 110.

A communication controlling program 1410a of a sound/FAX type is provided in place of the communication controlling program 1410 stored in the main memory unit 140. The communication controlling program 1410a of the sound/FAX type for transmitting and receiving data, used to be transmitted and received by the communication controlling program 1410 to and from the terminal 20, in the following new formats.

(1) In place of screen data displaying operational guidance and requesting inputs, operational guidance and sound corresponding to screens are output. In the case of a screen used for displaying a lot of information such as the personal information displaying screen 650 illustrated in FIG. 12, data displayed on the screen is converted into FAX data.

(2) Instead of requesting the user to select processing through a screen or to enter data such as a registrant ID, the user is requested to enter selection data, input data by generating sound using the push phone 20a or provide voice input.

According to the configuration described above, the user is allowed to utilize a push phone or a facsimile which is already widely used as a terminal 20. Thus, the problem described above, to reduce the cost to be borne by the user is solved.

As described above, the present invention provides an individual information controlling apparatus used for controlling pieces of personal information such as mainly resident card data and data representing certificates of seal impressions and used for outputting one of the pieces of personal information in response to a request made by the owner of the personal information wherein only a specific personal information referencer specified by a personal information registrant, that is, the owner of the piece of personal information, is capable of acquiring the piece of personal information in an online way. In addition, the individual information controlling apparatus provided by the present invention makes it no longer necessary for the personal information registrant and the specific personal information referencer specified by the personal information registrant to exchange electronic data.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

We claim:

1. An information controlling method of controlling information and permitting output of a specific piece of said information registered by an information registrant to an information referencer, said personal information controlling method comprising:

a registrant authenticating step of verifying validity of said information registrant requesting issuance of said inquiry code;

an inquiry code issuing step of generating and outputting an inquiry code in response to a request from said information registrant who registered said information, wherein said information registrant requests issuance of said inquiry code for use by said information referencer to obtain permission to access said specific piece of information, wherein said inquiry code serves as an identification of said specific piece of information;

an inquiry code control information cataloging step of cataloging inquiry code control information used as a record of said generated inquiry code;

an information acquiring step of requesting said information referencer to enter said inquiry code and a registrant identifier (ID), verifying validity of an inquiry code entered by said information referencer, and outputting said specific piece of information identified by said inquiry code if said inquiry code entered by said information referencer matches said inquiry code generated in response to said request from said information registrant and output at said inquiry code issuing step and said registrant ID matches a registrant ID of said information registrant; and an inquiry code invalidating step of invalidating said inquiry code control information for said inquiry code entered by said personal information referencer when said inquiry code entered by said personal information referencer is judged to be valid.

2. An information controlling method according to claim 1, wherein said inquiry code issuing step comprises:

an inquiry code generating step of generating said inquiry code, and wherein said information acquiring step comprises:

a personal information outputting step of outputting said specific piece of information identified by said inquiry code entered by said information referencer.

3. An information controlling method according to claim 2, wherein said inquiry code invalidating step judges said inquiry code entered by said information referencer to be valid if inquiry code control information for said inquiry code entered by said information referencer has been cataloged.

4. An information controlling method according to claim 3, wherein said inquiry code generating step comprises:

a validity term cataloging step of cataloging validity term information used as a record of a term of validity of said generated inquiry code and associated with inquiry code control information for said generated inquiry code, wherein said inquiry code invalidating step comprises:

a validity term inspecting step of inspecting a term of validity recorded in validity term information for an inquiry code entered by said information referencer if said validity term information is found cataloged, wherein said inquiry code entered by said information referencer is judged to be valid if said term of validity has not expired, and wherein if said term of validity has expired, said generated inquiry code is made invalid by invalidating inquiry code control information of said generated inquiry code and invalidating said validity term information.

5. An information controlling method according to claim 2, wherein said inquiry code generating step comprises:
   a referencer cataloging step of cataloging an information referencer specified by said information registrant as a referencer authorized to obtain permission to access said specific piece of information and associating said information referencer with said generated inquiry code,
   wherein said inquiry code invalidating step comprises:
      a referencer authenticating step of verifying validity of a information referencer intended to acquire said specific piece of information, and
      a specified referencer verifying step of verifying that an information referencer intended to acquire said specific piece of information is said information referencer specified by said information registrant as said authorized referencer at said inquiry code issuing step by collation of said information referencer intended to acquire said specific piece of information with said information referencer cataloged at said referencer cataloging sub-step, and
   wherein an entered inquiry code is judged to be valid at said inquiry code invalidating step if said validity of said information referencer specified by said information registrant is verified at said referencer authenticating sub-step and said information referencer intended to acquire said specific piece of information is found coincident with said cataloged personal information referencer at said specified referencer verifying sub-step.

6. A personal information controlling method according to claim 2, wherein at said inquiry code generating step, an inquiry code is generated by application of an inquiry code generating function, not disclosed to personal information referencers, to inquiry code clear text data entered by said personal information registrant,
   wherein at said inquiry code invalidating step, said personal information referencer is requested to enter both said inquiry code clear text data and said generated inquiry code, an inquiry code is regenerated by application of said inquiry code generating function to said inquiry code clear text data, said inquiry code entered by said personal information referencer is compared with said inquiry code, and said entered inquiry code is judged to be valid if said entered inquiry code matches said regenerated inquiry code.

7. A personal information controlling method according to claim 6, wherein said inquiry code generating step is provided with a plurality of different function expressions one of which is selected based on at least one of said personal information registrant and said personal information referencer.

8. An information controlling apparatus for controlling information and permitting output of a specific piece of said information system by an information registrant, who registered said specific piece of information, to an information referencer, who needs permission to access said specific piece of information, said information controlling apparatus comprising:
   a registrant authenticating means for verifying validity of said information registrant requesting issuance of said inquiry code;
   an inquiry code issuing means for generating and outputting an inquiry code in response to a request from said information registrant who registered said information wherein said information registrant request issuance of said inquiry code for use by said information referencer to obtain permission to access said specific piece of information wherein said inquiry code serves as an identification of said specific piece of information;
   an inquiry code control information cataloging means for cataloging inquiry code control information used as a record of said generated inquiry code;
   an information acquiring means for requesting said information referencer to enter said inquiry code and a registrant identifier (ID)), verifying validity of an inquiry code entered by said information referencer and outputting said specific piece of information identified by said inquiry code if said inquiry code entered by said information referencer matches said inquiry code generated in response to said request from said information registrant and output by said inquiry code issuing means and said registrant ID matches a registrant ID of said information registrant; and
   an inquiry code invalidating means for invalidating said inquiry code control information for said inquiry code entered by said personal information referencer when said inquiry code entered by said personal information referencer is judged to be valid.

9. A personal information controlling apparatus according to claim 8, wherein said inquiry code issuing means comprises:
   an inquiry code generating means for generating said inquiry code, and
   wherein said personal information acquiring means comprises:
      a personal information outputting means for outputting said specific piece of personal information identified by said inquiry code entered by said personal information referencer.

10. An information controlling apparatus according to claim 9, wherein said inquiry code invalidating means judges an inquiry code entered by said information referencer to be valid if inquiry code control information for said inquiry code entered by said information referencer is found cataloged by said inquiry code authenticating means.

11. An information controlling apparatus according to claim 10, wherein said inquiry code generating means comprises:
   a validity term cataloging means for cataloging validity term information used as a record of a term of validity of said generated inquiry code and associated with inquiry code control information for said generated inquiry code,
   wherein said inquiry code invalidating means comprises:
      a validity term inspecting means which is used for inspecting a term of validity recorded in validity term information for an inquiry code entered by said information referencer if said validity term information is found cataloged,
      wherein said inquiry code entered by said information referencer is judged to be valid if said term of validity has not expired, and
      wherein if said term of validity has expired, said generated inquiry code is made invalid by invalidating inquiry code control information of said generated inquiry code and invalidating said validity term information.

12. An information controlling apparatus according to claim 9, wherein said inquiry code generating means comprises:

a referencer cataloging means for cataloging an information referencer specified by said information registrant as a referencer authorized to refer to said specific piece of information on said information registrant and associating said information referencer with said generated inquiry code, wherein said inquiry code invalidating means comprises:
a referencer authenticating means for verifying validity of an information referencer intended to acquire said specific piece of information, and
a specified referencer verifying sub-means for verifying that an information referencer intended to acquire said specific piece of information is said information referencer specified by said information registrant as said authorized referencer to said inquiry code issuing means by collation of said information referencer intended to acquire said specific piece of information with said information referencer cataloged by said referencer cataloging sub-means, and wherein an entered inquiry code is judged to be valid by said inquiry code invalidating means if said validity of said information referencer specified by said information registrant is verified by said referencer authenticating sub-means and said information referencer intended to acquire said specific piece of information is found coincident with said cataloged information referencer by said specified referencer verifying sub-means.

13. A personal information controlling apparatus according to claim 9, wherein said inquiry code generating means generates an inquiry code by application of an inquiry code generating function, not disclosed to personal information referencers to inquiry code clear text data entered by said personal information registrant, and wherein said inquiry code invalidating means requests said personal information referencer to enter both said inquiry code clear text data and said generated inquiry code, regenerates an inquiry code by application of said inquiry code generating function to said inquiry code clear text data, compares said inquiry code entered by said personal information referencer with said regenerated inquiry code regenerated, and judges said entered inquiry code to be valid only if said entered inquiry code matches said regenerated inquiry code.

14. A personal information controlling apparatus according to claim 13, wherein said inquiry code generating means is provided with a plurality of different function expressions one of which is selected based on at least one of said personal information registrant and said personal information referencer.

15. An information controlling method of controlling information and permitting output of a specific piece of said information registered by an information registrant to an information referencer, said personal information controlling method comprising:

a registrant authenticating step of verifying validity of said information registrant requesting issuance of said inquiry code;

an inquiry code issuing step of generating and outputting an inquiry code in response to a request from said information registrant who registered said information, wherein said information registrant requests issuance of said inquiry code for use by said information referencer to obtain permission to access said specific piece of information, wherein said inquiry code serves as an identification of said specific piece of information;

an inquiry code control information cataloging step of cataloging inquiry code control information used as a record of said generated inquiry code;

a validity term cataloging step of cataloging validity term information used as a record of a term of validity of said generated inquiry code and associated with inquiry code control information for said generated inquiry code;

an information acquiring step of requesting said information referencer to enter said inquiry code and a registrant identifier (ID), verifying validity of an inquiry code entered by said information referencer, and outputting said specific piece of information identified by said inquiry code if said inquiry code entered by said information referencer matches said inquiry code generated in response to said request from said information registrant and output at said inquiry code issuing step and said registrant ID matches a registrant ID of said information registrant; and a validity term inspecting step of inspecting a term of a validity recorded in validity term information for an inquiry code entered by said information referencer if said validity term information is found cataloged, wherein said inquiry code entered by said information referencer is judged to be valid if said term of validity has not expired, and wherein if said term of validity has expired, said generated inquiry code is made invalid by invalidating inquiry code control information of said generated inquiry code and invalidating said validity term information.

* * * * *